(12) United States Patent
Cho et al.

(10) Patent No.: US 9,475,048 B2
(45) Date of Patent: Oct. 25, 2016

(54) CENTRIFUGAL FORCE-BASED MICROFLUIDIC DEVICE FOR MULTIPLXED ANALYSIS AND DETECTION METHOD USING THE SAME

(75) Inventors: Yoon-Kyoung Cho, Ulsan (KR); Ji-Woon Park, Ulsan (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 573 days.

(21) Appl. No.: 13/358,119

(22) Filed: Jan. 25, 2012

(65) Prior Publication Data
US 2013/0034865 A1   Feb. 7, 2013

(30) Foreign Application Priority Data

Aug. 3, 2011   (KR) .......................... 10-2011-0077504

(51) Int. Cl.
*B01L 3/00* (2006.01)
*F16K 99/00* (2006.01)

(52) U.S. Cl.
CPC ........ *B01L 3/502738* (2013.01); *F16K 99/003* (2013.01); *F16K 99/004* (2013.01); *F16K 99/0032* (2013.01); *B01L 2300/0803* (2013.01); *B01L 2300/087* (2013.01); *B01L 2300/0867* (2013.01); *B01L 2400/0406* (2013.01); *B01L 2400/0409* (2013.01); *B01L 2400/0677* (2013.01)

(58) Field of Classification Search
CPC ... C12M 1/34; B01L 3/502753; B01L 3/502; B01L 3/5025; B01L 3/5027; B01L 3/502738; B01J 2219/00274; B04B 5/0442; G01N 35/10; G01N 35/02; G01N 33/53; G01N 2201/04; G01N 2035/0439; G01N 2035/0453; G01N 2035/00247; G01N 2223/64
See application file for complete search history.

(56) References Cited

U.S. PATENT DOCUMENTS

| | | | |
|---|---|---|---|
| 2001/0055812 A1* | 12/2001 | Mian et al. | 436/45 |
| 2007/0183934 A1* | 8/2007 | Diercks et al. | 422/100 |
| 2008/0300148 A1* | 12/2008 | Lee et al. | 506/39 |
| 2009/0053108 A1* | 2/2009 | Cho et al. | 422/72 |
| 2010/0086925 A1* | 4/2010 | Lee et al. | 435/6 |

FOREIGN PATENT DOCUMENTS

| | | |
|---|---|---|
| KR | 10-2008-0022027 | 3/2008 |
| KR | 10-2010-0038007 | 4/2010 |

OTHER PUBLICATIONS

Cho, Yoon-Kyoung, Fully Intergrated Immunoassays on a Disc, Bioelectronics, Biointerfaces, and Biomedical Applications 4, vol. 35, Issue7, May 1, 2011, Montreal, QC, Canada.

* cited by examiner

*Primary Examiner* — Rebecca Martinez
(74) *Attorney, Agent, or Firm* — Lex IP Meister, PLLC

(57) ABSTRACT

A centrifugal force-based microfluidic device for a multiplexed analysis and an analyzing method using the same are provided. The microfluidic device includes a platform and a microfluidic structure including a plurality of chambers formed within the platform and valves positioned between the chambers. The microfluidic structure includes a sample separation chamber connected to a sample injection hole and a plurality of reaction chambers accommodating two or more types of markers specifically reacting to different types of target materials, separately by type.

7 Claims, 30 Drawing Sheets

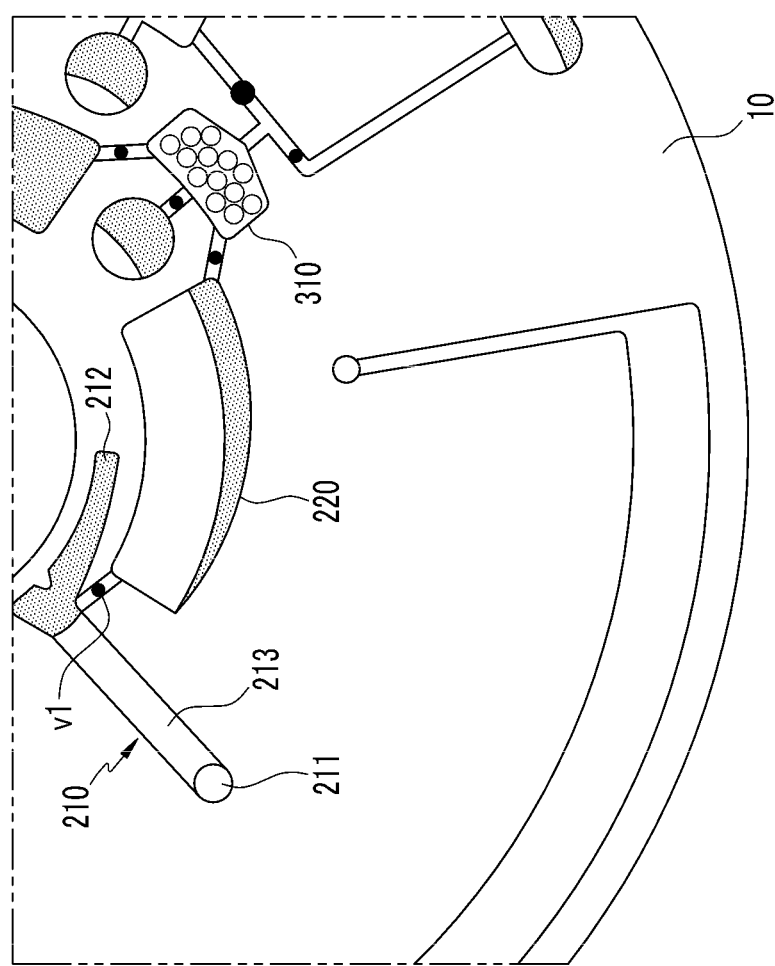

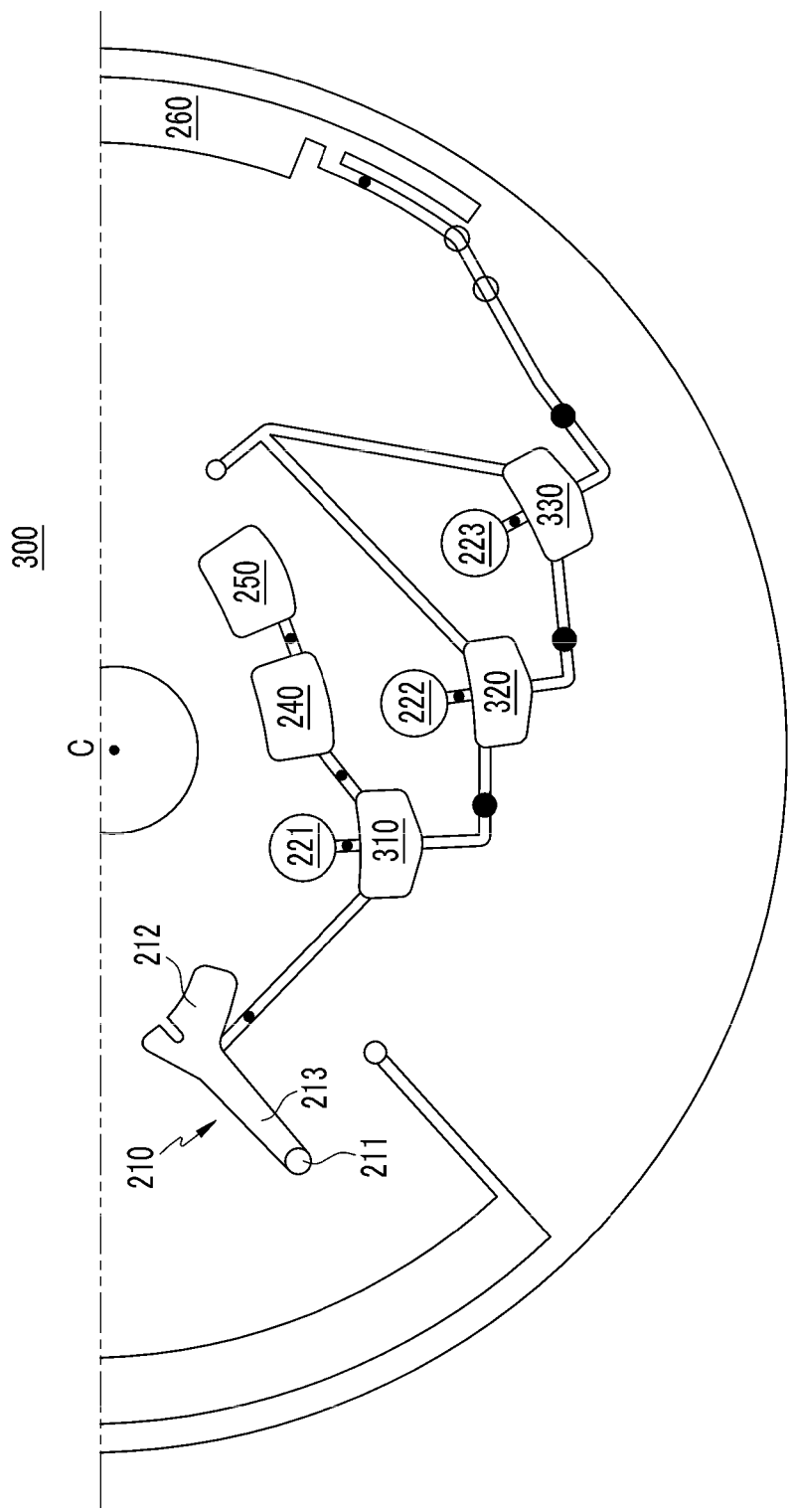

CENTRIFUGAL FORCE-BASED MICROFLUIDIC DEVICE FOR MULTIPLXED ANALYSIS AND DETECTION METHOD USING THE SAME

CROSS-REFERENCE TO RELATED APPLICATION

This application claims priority to and the benefit of Korean Patent Application No. 10-2011-0077504 filed in the Korean Intellectual Property Office on Aug. 3, 2011, the entire contents of which are incorporated herein by reference.

BACKGROUND OF THE INVENTION (a) Field of the Invention

The present invention relates to a centrifugal force-based microfluidic device capable of performing an immunological test, a genetic test, a biochemical test, environmental pollutant analysis, and the like, and analyzing method using the same.

(b) Description of the Related Art

A microfluidic device includes a plurality of chambers each storing a small amount of fluid, valves controlling a fluid flow between the chambers, and various functional units each performing a designated function upon receiving a fluid.

A lab-on-a-chip is a chip including a microfluidic device, and several steps of reactions and manipulations may be performed thereon. In particular, a lab-on-a-chip using centrifugal force as a driving pressure for separating a sample and transferring a fluid is called a lab-on-a disc. The related art microfluidic device in the form of a lab-on-a-disk is generally configured to detect a single target material from a sample.

In order to detect several target materials from the sample, different types of markers are coated on designated position of a surface and reaction positions are scanned after a reaction, to analyze the target materials, or reaction mediators, such as a barcode, fluorescence particles, or beads in various shapes, which can be identified later, in a single reaction chamber are utilized as disclosed in Korean Laid Open Publication No. 10-2010-0038007, and so on. However, such types of microfluidic devices have limitations in that detection hardware and software are complicated and high analysis costs are incurred.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a microfluidic device for a multiplexed analysis having advantages of simultaneously detecting a plurality of target materials from a single sample, and an analyzing method using the same. The present invention has also been made in an effort to provide a microfluidic device for a multiplexed analysis having advantages of reducing an overall size and the volume of fluids required for an analysis, and shortening an analysis time, and an analyzing method using the same.

An exemplary embodiment of the present invention provides a microfluidic device including: a platform and a microfluidic structure including a plurality of chambers formed within the platform and valves positioned between the chambers. The microfluidic structure includes a plurality of reaction chambers accommodating two or more types of markers specifically reacting to different types of target materials, separately by type.

Each of the plurality of reaction chambers may accommodate a reaction mediator with markers coated thereon. The plurality of reaction chambers may be connected or isolated at some of stages of a reaction. The platform may be divided into a plurality of areas, and the microfluidic structure may be provided at each of the plurality of areas and independently operate.

The microfluidic structure may include a sample separation chamber. The sample separation chamber may include a sample collection unit formed to be parallel to a circumferential direction of the platform and a sediment collection unit connected to the sample collection unit and formed to be parallel to a radial direction of the platform. The plurality of reaction chambers may include a first reaction chamber which is first provided with a sample and the last reaction chamber which is last provided with the sample.

The microfluidic structure may include a first storage chamber positioned in front of the first reaction chamber and accommodating a mixture of two or more types of detection probes.

The first storage chamber may be connected to the first reaction chamber through a normally closed valve, and the plurality of reaction chambers may be positioned to be farther than the first storage chamber from a rotation center of the platform. The plurality of reaction chambers may be connected through normally open valves so as to be sequentially provided with the mixture of the detection probes from the first storage chamber.

The microfluidic structure may include a plurality of second storage chambers connected to the plurality of reaction chambers through normally closed valves and accommodating a substrate solution, respectively. The plurality of reaction chambers may be isolated as the normally open valves are closed after the coupling reaction between the target materials and the markers, and may be provided with the substrate solution from the plurality of second storage chambers, respectively.

The microfluidic structure may include a plurality of first storage chambers connected to the plurality of reaction chambers and accommodating two or more types of detection probes separately by type, respectively. The plurality of first storage chambers may accommodate detection probes to which at least one of labeling materials is bonded. The labeling material may comprise at least one of a fluorescence material and a chemiluminescence material. The microfluidic structure may include a plurality of second storage chambers connected to the plurality of first storage chambers and accommodating a substrate solution, respectively.

The microfluidic structure may include a third storage chamber connected to the first reaction chamber through a normally closed valve and accommodating a cleansing solution. The microfluidic structure may include a fourth storage chamber connected to the third storage chamber through a normally closed valve and accommodating a cleansing solution.

The microfluidic structure may include a fifth storage chamber connected to the last reaction chamber and accommodating a residual solution. One normally closed valve, two reversible normally open valves, and one normally open valve may be installed between the last reaction chamber and the fifth storage chamber.

The microfluidic structure may include a plurality of detection chambers connected to the plurality of reaction chambers through normally closed valves and accommodating a stop solution, respectively.

Another embodiment of the present invention provides a microfluidic device including: a platform and a microfluidic structure including a plurality of chambers formed within the platform and valves positioned between the chambers. The microfluidic structure includes a plurality of reaction chambers accommodating two or more types of capture molecules specifically reacting to different types of target materials, separately by type. The capture molecules comprise at least one of antibodies, peptides, nucleotides, and polymers. Each of the plurality of reaction chambers may accommodate a bead with the capture molecules coated thereon.

Yet another embodiment of the present invention provides a multiplexed analyzing method using a microfluidic device, including: transferring a sample to a first storage chamber accommodating a mixture of two or more types of detection probes; sequentially transferring the mixture within the first storage chamber to a plurality of reaction chambers accommodating two or more types of markers specifically reacting to different types of target materials, separately by type, and performing an incubation reaction; discharging impurities, excluding target materials coupled to markers and detection probes, among the mixture within the reaction chambers; isolating the reaction chambers and supplying a substrate solution to the reaction chambers; and transferring the mixture within the reaction chambers to the detection chambers, and measuring absorbance of the detection chambers.

Still another embodiment of the present invention provides a multiplexed analyzing method using a microfluidic device, including: sequentially transferring a sample to a plurality of reaction chambers accommodating two or more types of markers specifically reacting to different types of target materials, separately by type; transferring detection probes corresponding to the pertinent target materials to the plurality of reaction chambers and performing an incubation reaction; discharging impurities, excluding target materials coupled to markers and detection probes, among the mixture within the reaction chambers; isolating the reaction chambers and supplying a substrate solution to the reaction chambers; and transferring the mixture within the reaction chambers to the detection chambers, and measuring absorbance of the detection chambers.

Another embodiment of the present invention provides a multiplexed analyzing method using a microfluidic device, including: sequentially transferring a sample to a plurality of reaction chambers accommodating two or more types of markers specifically reacting to different types of target materials, separately by type; transferring fluorescence or chemiluminescence material-bonded detection probes corresponding to the pertinent target materials to the plurality of reaction chambers and performing an incubation reaction; discharging impurities, excluding target materials coupled to markers and detection probes, among the mixture within the reaction chambers; and measuring a fluorescence or illumination detection signal of the reaction chambers.

BRIEF DESCRIPTION OF THE DRAWINGS

FIGS. 6A to 6I are partial enlarged view of the microfluidic device illustrated to explain a specimen analyzing method according to a first embodiment of the present invention.

FIG. 8 is a schematic view of a microfluidic device according to a third embodiment of the present invention.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
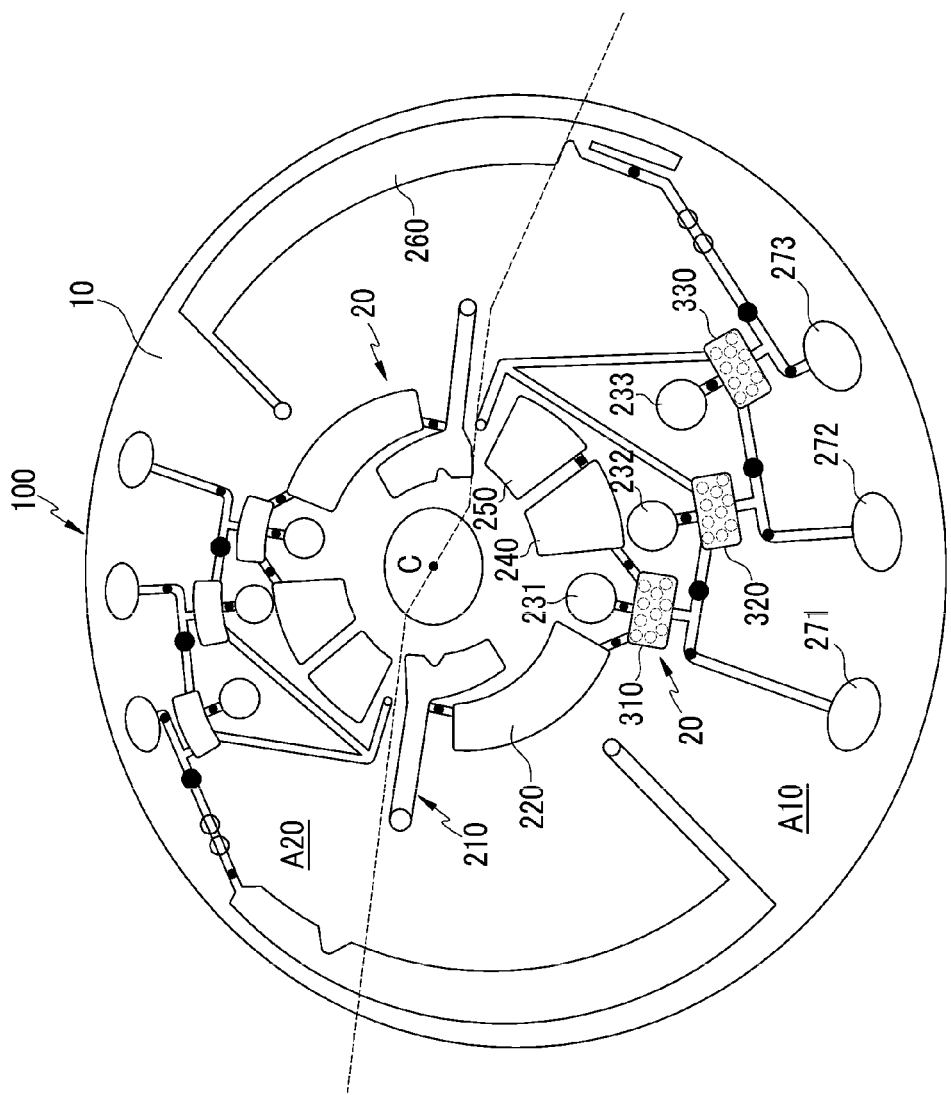
FIG. 1 is a schematic view of a microfluidic device according to a first embodiment of the present invention.

FIG. 1 is a schematic view of a microfluidic device according to a first embodiment of the present invention.

With reference to FIG. 1, a microfluidic device 100 according to a first embodiment of the present invention includes a rotatable disk type platform 10 and a microfluidic structure 20 formed within the platform 10. The microfluidic structure 20 includes chambers for accommodating a fluid and valves installed between chambers to control a fluid flow. The chambers may be connected to the valves by channels or may be directly connected to the valves without a channel.

The platform 10 has a rotation center and may be formed to have, for example, a disk-like shape. The platform 10 may be made of a plastic material which can be easily molded and has a biologically inactive surface, e.g., polystyrene (PS), polydimethylsiloxane (PDMS), polymethylmethacrylate (PMMA), polyacrylate, polycarbonate, polycyclic olefin, polyimide, polyurethane, or the like. Also, the platform 10 may be made of a material having chemical and biological stability and optical transparency.

The platform 10 may include a plurality of plates, e.g., an upper plate and a lower plate. The microfluidic structure 20 is formed to be intagliated on an inner face of the upper plate or the lower plate to provide chambers accommodating a fluid and valves controlling a fluid flow. The upper plate and the lower plate are bonded through various methods such as adhesion using an adhesive, ultrasonic joining (or ultrasonic fusion or welding), laser bonding, or the like, to constitute the microfluidic device 100.

The platform 10 is divided into a plurality of areas, and the microfluidic structure 20, which independently operates, is provided at each area. For example, the platform 10 may be divided into a first area A10 and a second area A20, and the microfluidic structure 20 for simultaneously detecting a plurality of target materials from a sample is provided at each of the first area A10 and the second area A20.

In the present embodiment, the microfluidic structures 20 disposed at the first area A10 and the second area A20 have the same structure, so the microfluidic structure 20 disposed at the first area A10 will be described hereinafter.

Figure 2:
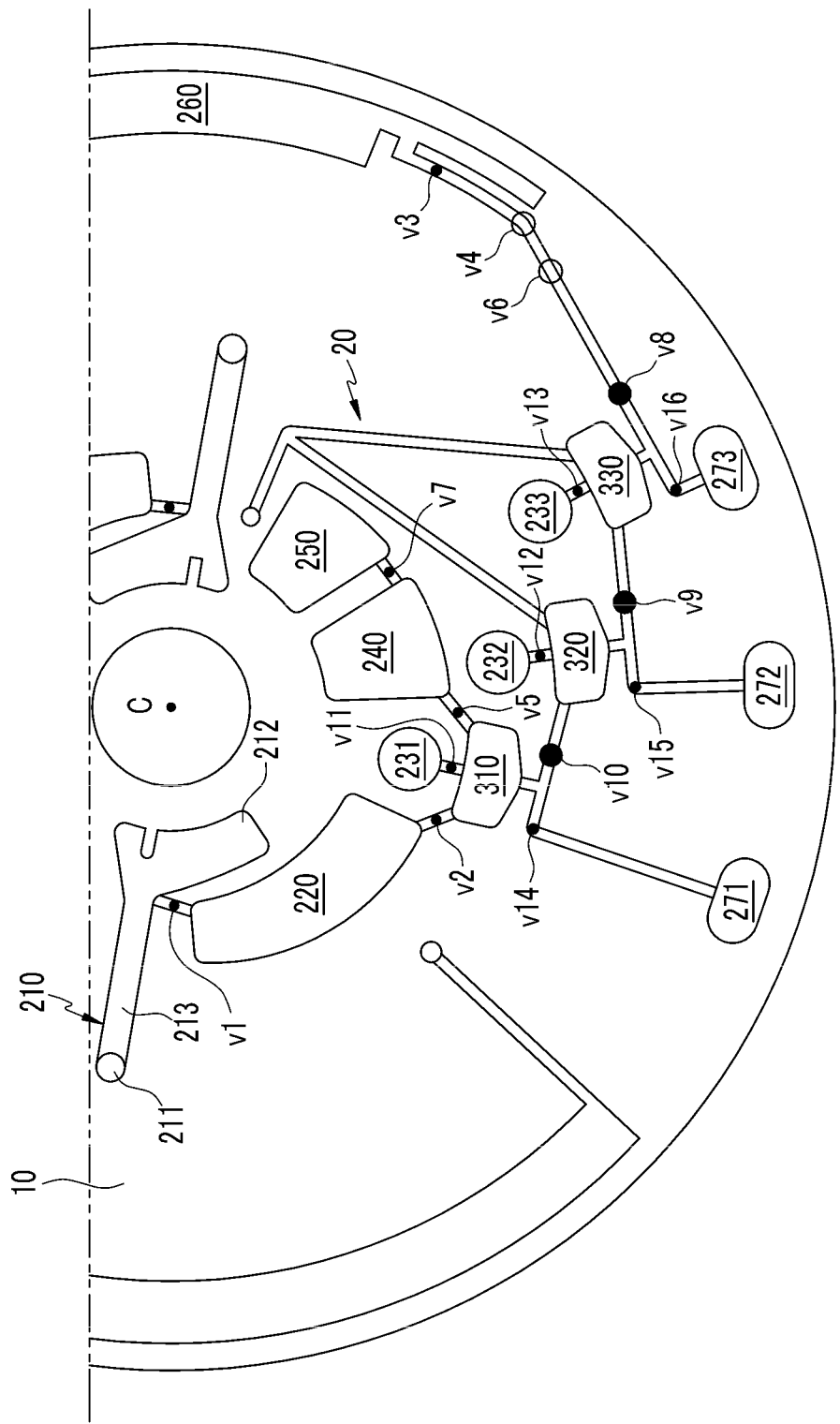
FIG. 2 is a partial enlarged view of the microfluidic device illustrated FIG. 1.

FIG. 2 is a partial enlarged view of the microfluidic device illustrated FIG. 1.

With reference to FIG. 2, the microfluidic structure 20 may include a sample separation chamber 210 connected to a sample injection hole 211. The sample separation chamber 210 provides a space accommodating a sample including a liquid, e.g., blood, saliva, urine, river water, and a sample of soil, or the like.

The sample separation chamber 210 includes a sample collection unit 212 formed to be parallel to a circumferential direction of the platform 10, and a sediment collection unit 213 connected to the sample collection unit 212 and formed to be parallel to a radial direction of the platform 10. The sample injection hole 211 may be formed at an end portion of the sediment collection unit 213, and the sample collection unit 212 may be positioned to be closer than the sediment collection unit 213 to the rotation center C of the platform 10.

According to types of samples, the sample separation chamber 210 of the microfluidic structure 20 may be omitted, or a sediment liquid collected in the sediment collection unit 213 may be used as a sample.

The microfluidic structure 20 includes a first storage chamber 220 accommodating a mixture of two or more detection probes. The first storage chamber 220 is positioned to be farther than the sample collection unit 212 from the rotation center C of the platform 10. The mixture of the detection probes includes types of detection probes corresponding to the number of reaction chambers 310, 320, and 330 (to be described). Namely, when three reaction chambers 310, 320, and 330 are provided, the first storage chamber 220 accommodates the mixture of the three types of detection probes.

The mixture of the detection probes may be a conjugate mixture for an immunological test. For example, the microfluidic device 100 may be used to detect three types of target proteins such as C-reaction protein (CRT), cTn I (cardiac troponin I), and NT-proBNP (N-terminal pro-B-type natriuretic peptide) for diagnosing a cardiovascular disease. In this case, the first storage chamber 220 may accommodate a mixture of the three types of detection probes (anti-CRP, anti-cTn I, and anti-NT-proBNP) to which HRP (horseradish peroxidase) is bonded.

A normally closed valve v1 is positioned between the sample collection unit 212 and the first storage chamber 220. When the normally closed valve v1 is opened, the first storage chamber 220 is connected with the sample collection unit 212. A channel may be formed between the sample collection unit 212 and the first storage chamber 220. The normally closed valve v1 shuts off a fluid flow until when it is opened upon receiving energy.

Figure 3:
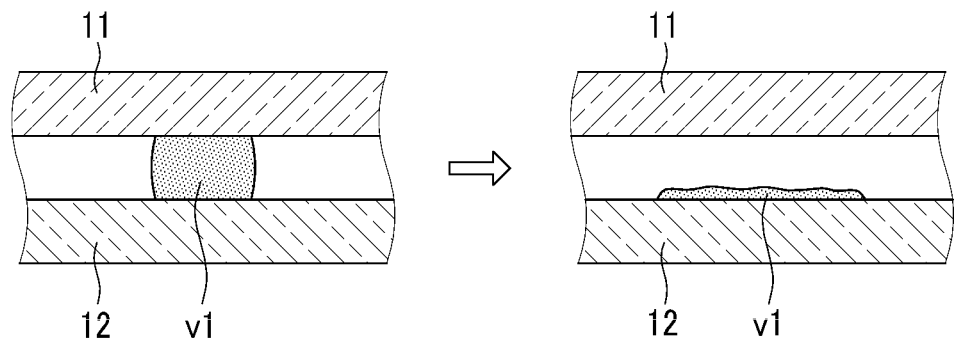
FIG. 3 is a schematic view showing an example of a normally closed valve of the microfluidic device illustrated in FIG. 2.

FIG. 3 is a schematic view showing an example of the normally closed valve.

With reference to FIG. 3, the normally closed valve v1 includes a valve material that exists in a solid state at room temperature to shut off the fluid flow. The valve material may include a heater material whose temperature is increased upon absorbing electromagnetic waves and a material, such as paraffin wax, which can be melted and coagulate according to temperature. When electromagnetic wave energy (laser, visible ray, infrared ray, or the like) is applied to the normally closed valve v1, the heater material instantaneously melts the paraffin wax to change the normally closed valve v1 into an opened state, and the valve material re-coagulates in the opened state.

In FIG. 3, reference numeral 11 denotes the upper plate of the platform 10, and 12 denotes the lower plate of the platform 10.

With reference back to FIG. 2, the microfluidic structure 20 includes a plurality of reaction chambers 310, 320, and 330 each including two or more types of markers specifically reacting different types of target materials. The two or more types of markers are installed in the plurality of reaction chambers 310, 320, and 330, separately by type. The plurality of reaction chambers 310, 320, and 330 may be configured to include the corresponding markers directly coated thereon or may accommodate reaction mediators such as beads with markers coated thereon.

Here, a 'target material' is an object material desired to be analyzed from the sample. For example, a target material may be a molecule-level material constituting a living body. The target material includes, for example, protein, an antigen, an antibody, an enzyme, DNA, RNA, hormone, a chemical material, and the like.

A 'marker' refers to a material particularly reacting to a target material to capture the target material. For example, a marker may make a protein interaction, an antigen-antibody reaction, an enzyme-substrate reaction, or a sequence-specific reaction, or the like, with a target material. As the two or more types of markers installed in mutually different reaction chambers, those which do not have cross reactivity are used.

For example, the microfluidic structure 20 includes a plurality of reaction chambers 310, 320, and 330 each including two or more types of capture molecules specifically reacting to different types of target materials, separately by type. The capture molecules include at least one of antibodies, peptides, nucleotides, and polymers.

"Cross reactivity' refers to that when a marker makes a reaction to be bonded with two or more types of target materials, the marker reacts to both the target material specific to the material and also to a material having a similar structure or having a partially same structure The two or more types of markers installed in the plurality of reaction chambers 310, 320, and 330 must specifically react to corresponding target materials and must not have cross-reactivity to each other.

When the microfluidic device 100 is used for an immune serum test, a bead on which a capture antibody is coated may be used, and when the microfluidic device 100 is used for a gene analysis, a bead on which a corresponding genetic material is coated may be used. Also, when the microfluidic device 100 is used for an immune serum test, various materials such as aptamer, or the like, may be used.

The reaction mediator configured as a bead has advantages in that it can be conveniently used, a mixed reaction is effective, and various types of target reactions are easily made, and here, the reaction mediator is not limited to the foregoing bead but includes a case in which a captured material specifically reacting to a target material is directly fixed to the surface of the reaction chambers 310, 320, and 330.

The number of the reaction chambers 310, 320, and 330 is equal to the number of target materials desired to be detected. The reaction chambers 310, 320, and 330 may include a first reaction chamber 310, a second reaction chamber 320, and a third reaction chamber 330. In FIG. 2, three reaction chambers 310, 320, and 330 are illustrated, but the number of the reaction chambers 310, 320, and 330 is not limited thereto.

A first bead coated with a first marker, a second bead coated with a second marker and a third bead coated with a third maker may be positioned at the first reaction chamber 310, the second reaction chamber 320, and the third reaction chamber 330, respectively. The first to third beads may be plastic beads, e.g., polystyrene (PS) beads, and may have a size of micrometer.

When the microfluidic device 100 is used for detecting the foregoing three types of target proteins for diagnosing a cardiovascular disease, the first marker may be a CRP capture antibody and the second marker may be a cTn I capture antibody. The third marker may be a NT-proBNP capture antibody. The types of markers may not be limited to the foregoing examples, and may vary depending on a type of target protein.

The plurality of reaction chambers 310, 320, and 330 are positioned to be farther than the first storage chamber 220 from the rotation center C of the platform 10. The first reaction chamber 310, the second reaction chamber 320, and the third reaction chamber 330 in this order may be positioned to be closer to the first storage chamber 220. A normally closed valve v2 is positioned between the first storage chamber 220 and the first reaction chamber 310.

The plurality of reaction chambers 310, 320, and 330 may be maintained to be connected by normally open valves in an initial state before a sample is input. Namely, a normally open valve v10 may be positioned between the first reaction chamber 310 and the second reaction chamber 320, and a normally open valve v9 may be positioned between the second reaction chamber 320 and the third reaction chamber 330. The normally open valves v10 and v9 are open between the chambers to allow a fluid to flow until when they are shut off upon receiving energy from the outside.

Meanwhile, the plurality of reaction chambers 310, 320, and 330 may be maintained in an independent state by normally closed valves in the initial state before the sample is input, and then, may be connected in some of steps during a reaction. In this case, normally closed valves are positioned between the reaction chambers 310, 320, and 330.

Figure 4:
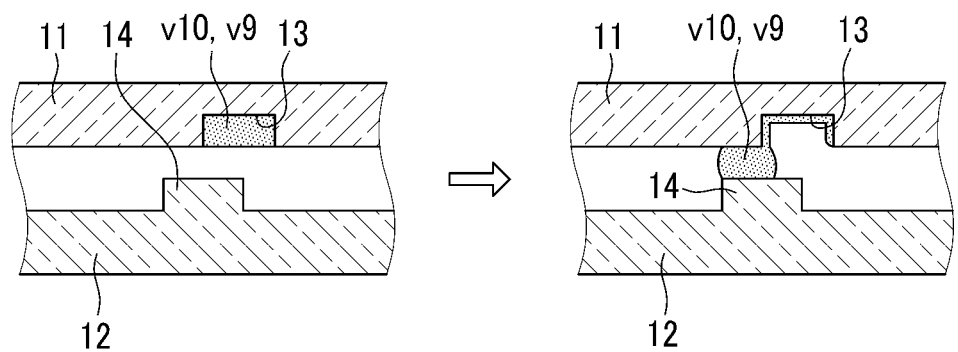
FIG. 4 is a schematic view showing an example of normally open valves of the microfluidic device illustrated in FIG. 2.

FIG. 4 is a schematic view showing an example of normally open valves.

With reference to FIG. 4, a concave portion 13 and a convex portion 14 are positioned within the platform 10 in which normally open valves v10 and v9 are installed, and the concave portion 13 is filled with a valve material to open between the chambers. In FIG. 4, a case in which the concave portion 13 is positioned on the upper plate 11 of the platform 10 and the convex portion 14 is positioned on the lower plate 12 of the platform 10 is illustrated, but the opposite case can be also available. Central positions of the concave portion 13 and the convex portion 14 may be inconsistent, rather than coincide.

The valve material may be the same as the valve material described above with respect to the normally closed valve. When electromagnetic wave energy is applied to the concave portion 13 of the normally open valves v10 and v9, the valve material may be melted to move from the concave portion 13 to the convex portion 14 and then coagulate, shutting off between the chambers. The valve material re-coagulates in the closed state.

With reference back to FIG. 2, the microfluidic structure 20 includes a plurality of second storage chambers 231, 232, and 233 connected to the reaction chambers 310, 320, and 330, and accommodating a substrate solution, respectively. The second storage chambers 231, 232, and 233 are positioned to be closer than the reaction chambers 310, 320, and 330 connected thereto to the rotation center C of the platform 10.

The substrate solution serves to substrate-react with the result of a conjugate reaction to express a certain color, and color formation occurs in color corresponding to the amount of the target materials according to the substrate reaction.

A normally closed valve v11 is positioned between the first reaction chamber 310 and the pertinent second storage chamber 231, and a normally closed valve v12 is positioned between the second reaction chamber 320 and the pertinent second storage chamber 232. A normally closed valve v13 is positioned between the third reaction chamber 330 and the pertinent second storage chamber 233. Channels may be formed between the plurality of reaction chambers 310, 320, and 330 and the pertinent second storage chambers 231, 232, and 233.

The microfluidic structure 20 may include a third storage chamber 240 connected to the first reaction chamber 310 and accommodating a cleansing solution and a fourth storage chamber 250 connected to the third storage chamber 240 and accommodating a cleansing solution. The cleansing solution may be a solution for cleansing residues after the reaction between the target materials and the markers. When cleansing is required to be performed two or more times, the two chambers 240 and 250 accommodating a cleansing solution may be provided to repeatedly perform a cleansing operation on the reaction chambers 310, 320, and 330.

A normally closed valve v5 is positioned between the third storage chamber 240 and the first reaction chamber 310 and a normally closed valve v7 is positioned between the fourth storage chamber 250 and the third storage chamber 240. The third storage chamber 240 and the fourth storage chamber 250 may be positioned to be closer than the first reaction chamber 310 to the rotation center C. The first storage chamber 220, the third storage chamber 240, and the fourth storage chamber 250 may be positioned side by side along a circumferential direction (rotational direction) of the platform 10.

The microfluidic structure 20 includes a fifth storage chamber 260 connected to the third reaction chamber 330 and accommodating a residual solution discarded from the reaction chambers 310, 320, and 330. The fifth storage chamber 260 is empty at the time of fabrication, and is formed to have an internal volume corresponding to an overall capacity of the sample, the mixture of detection probes, the substrate solution, and the cleansing solution.

The fifth storage chamber 260 is positioned to be farther than the third reaction chamber 330 from the rotation center C of the platform 10, and may be positioned at the outermost portion of the platform 10.

One normally closed valve v3, two reversible normally open valves v4 and v6, and one normally open valve v8 are positioned between the third reaction chamber 330 and the fifth storage chamber 260. The normally closed valve v3 is positioned to be close to the fifth storage chamber 260, and the normally open valve v8 is positioned to be close to the third reaction chamber 330. Two reversible normally open valves v4 and v6 are positioned between the normally closed valves v3 and v8.

Here, the 'reversible normally open valve' refers to a valve which cannot be changed into a closed state again once it is changed from an open state into a closed state and then changed into an open state. Namely, the 'reversible normally open valve' cannot be changed into an open state and closed state repeatedly several times. Namely, the reversible normally open valve refers to a valve which can be available for only a single reversible open state conversion. In the present embodiment, the valve available for only a single reversible state conversion is used, but a valve available for reversible state conversion several times may also be used.

Figure 5:
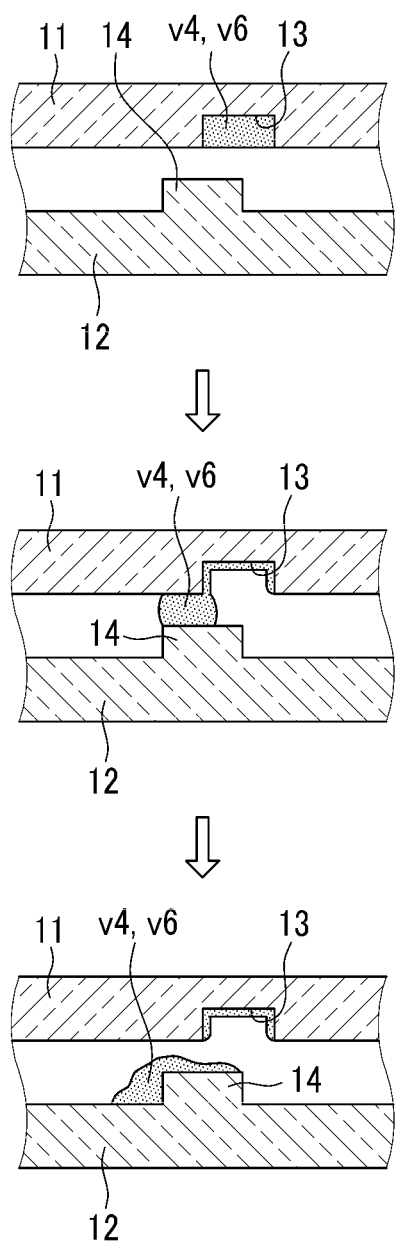
FIG. 5 is a schematic view showing an example of reversible normally open valves of the microfluidic device illustrated in FIG. 2.

FIG. 5 is a schematic view showing an example of the reversible normally open valves.

With reference to FIG. 5, a concave portion 13 and a convex portion 14 are positioned within the platform 10 where the reversible normally open valves v4 and v6 are installed, and the concave portion 13 is filled with a valve material to open between the chambers. The valve material may be the same as the valve material described above with respect to the normally open valves. When electromagnetic wave energy is applied to the concave portion 13, the valve material may be melted to move from the concave portion 13 to the convex portion 14 and then coagulate, shutting off between the chambers, and this process is the same as that of the foregoing normally open valves.

In the reversible normally open valves v4 and v6, electromagnetic wave energy is applied again to the valve material coagulated on the convex portion 14. Then, the valve material is melted down again to flow along the side of the convex portion 14, opening between the chambers, and the valve material re-coagulates in the open state. Thus, the reversible normally open valves v4 and v6 have characteristics in which they are opened, closed, and then returned to the opened state.

With reference back to FIG. 2, the microfluidic structure 20 includes a plurality of detection chambers 271, 272, and 273 connected to the reaction chambers 310, 320, and 330, and accommodating a final reactant, respectively. The detection chambers 271, 272, and 273 are chambers in which absorbance is measured, and the concentration of the target materials, i.e., the specimens, can be calculated through the absorbance measurement. A stop solution for stopping the substrate reaction is accommodated in advance in the plurality of detection chambers 271, 272, and 273.

The detection chambers 271, 272, and 273 are positioned to be farther than the reaction chambers 310, 320, and 330 connected thereto from the rotation center C of the platform 10. The detection chambers 271, 272, and 273 may be positioned to be parallel to the fifth storage chamber 260 along the circumferential direction (rotational direction) of the platform 10.

A normally closed valve is positioned between the first reaction chamber 310 and the first detection chamber 271, and a normally closed valve v15 is positioned between the second reaction chamber 320 and the second detection chamber 272. A normally closed valve v16 is positioned between the third reaction chamber 330 and the third detection chamber 273.

In FIG. 2, small black circles represent normally closed valves, large black circles represent normally open valves, and ring shapes represent reversible normally open valves.

In the microfluidic device 100 according to the present embodiment, a mixture of two or more types of detection probes is accommodated in the first storage chamber 220, and two or more types of markers specifically reacting to different types of target materials are installed in the plurality of reaction chambers 310, 320, and 330, separately by type. Here, the reaction chambers 310, 320, and 330 are connected by the normally open the valves v10 and v9.

Accordingly, the mixture of the detection probes accommodated in the first storage chamber 220 can be transferred to the reaction chambers 310, 320, and 330 within a short time by virtue of a single centrifugal force operation. The microfluidic device 100 according to the present embodiment can perform a multiplexed analysis of simultaneously detecting a plurality of target materials corresponding to the number of the reaction chambers 310, 320, and 330 from a single sample, and the overall reaction time can be shortened.

In particular, since the microfluidic device 100 includes the plurality of areas, e.g., the first area A10 and the second area A20, having the same structure, target materials, e.g., six target materials, corresponding to the number of the reaction chambers 310, 320, and 330 can be simultaneously detected from two different samples. The microfluidic device 100 can use a smaller amount of sample and cleansing solution (e.g., a sample of 200 μL and a cleansing solution of 700 μL) and shorten the overall reaction time into 20 minutes or shorter.

Hereinafter, a method for analyzing a target material using the foregoing microfluidic device will be described in detail with reference to FIGS. 6A to 6I.

With reference to FIG. 6A, a sample in a fluid state is input to the sample separation chamber 210 through the sample injection hole 211, and the platform 10 is rotated at a high speed to generate centrifugal force. A weighty sediment among the sample is moved to the sediment collection unit 213 by the centrifugal force, and the other remaining component is moved to the sample collection unit 212, thus being separated.

The first storage chamber 220 is isolated from the sample separation chamber 210 by the normally closed valve v1, and a mixture of three types of detection probes is accommodated in advance in the first storage chamber 220.

Figure 6B:
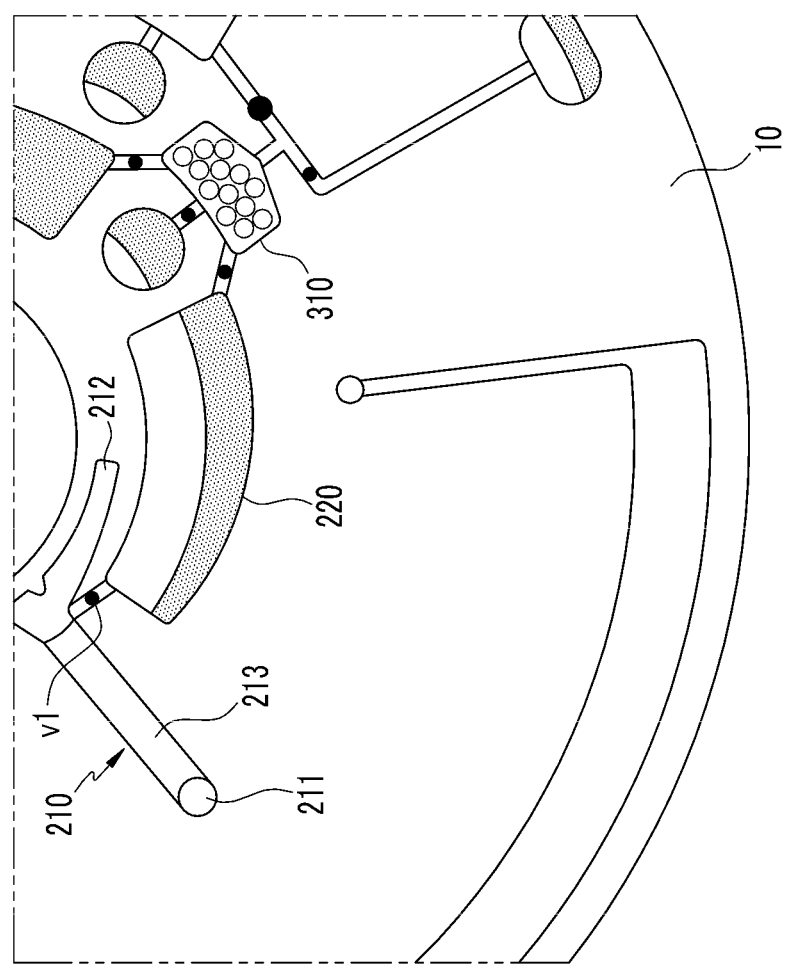

With reference to FIG. 6B, the normally closed valve v1 is opened by applying electromagnetic energy thereto, and the platform 10 is rotated to generate centrifugal force. Then, the sediment-removed sample is transferred to the first storage chamber 220 so as to be mixed with the mixture of the three types of detection probes.

Figure 6C:
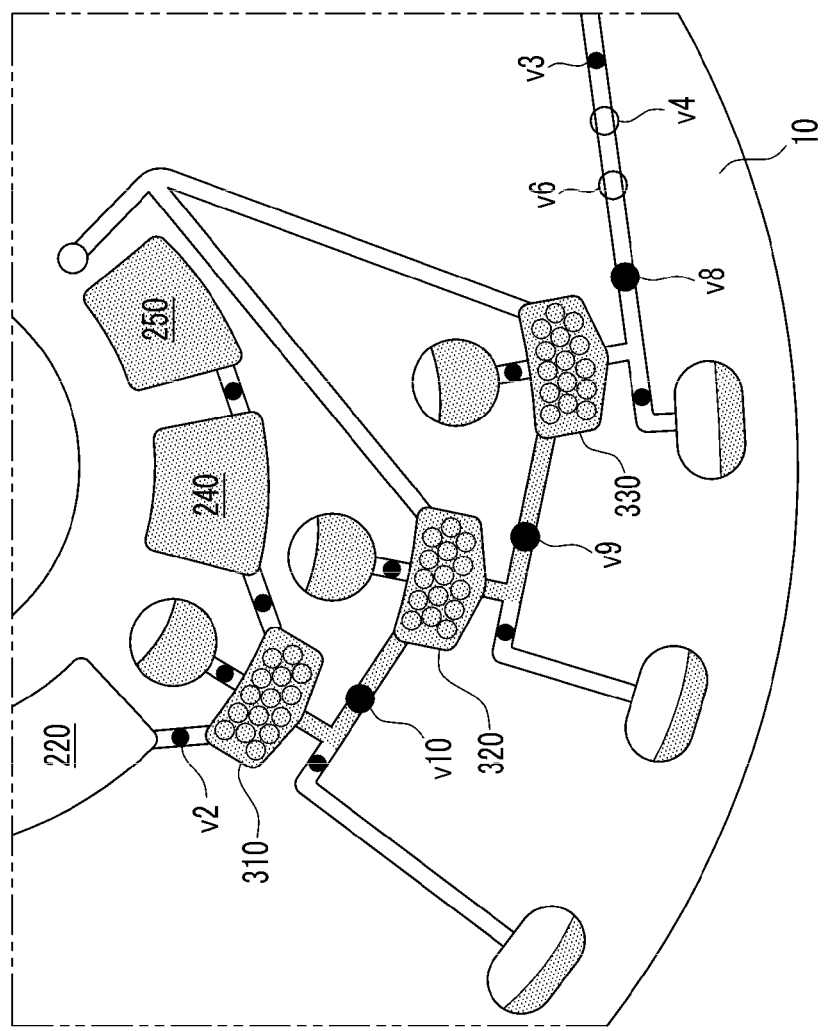

With reference to FIG. 6C, the normally closed valve v2 is opened by applying electromagnetic energy thereto, and the platform 10 is rotated to generate centrifugal force. The mixture of the first storage chamber 220 is transferred to the first reaction chamber 310, the second reaction chamber 320, and the third reaction chamber 330 in this order by the centrifugal force to fill the first, second, and third reaction chambers 310, 320, and 330.

Here, the first, second, and third reaction chambers 310, 320, and 330 are connected by the normally open valves v10 and v9, the mixture can be quickly transferred to all of the first, second, and third reaction chambers 310, 320, and 330 by the single centrifugal force operation. An incubation reaction is performed in the first, second, and third reaction chambers 310, 320, and 330 for about 10 minutes. The incubation reaction refers to a coupling reaction (or a fixation reaction) between the markers, the specimens corresponding to the markers, and the detection probe.

Figure 6D:
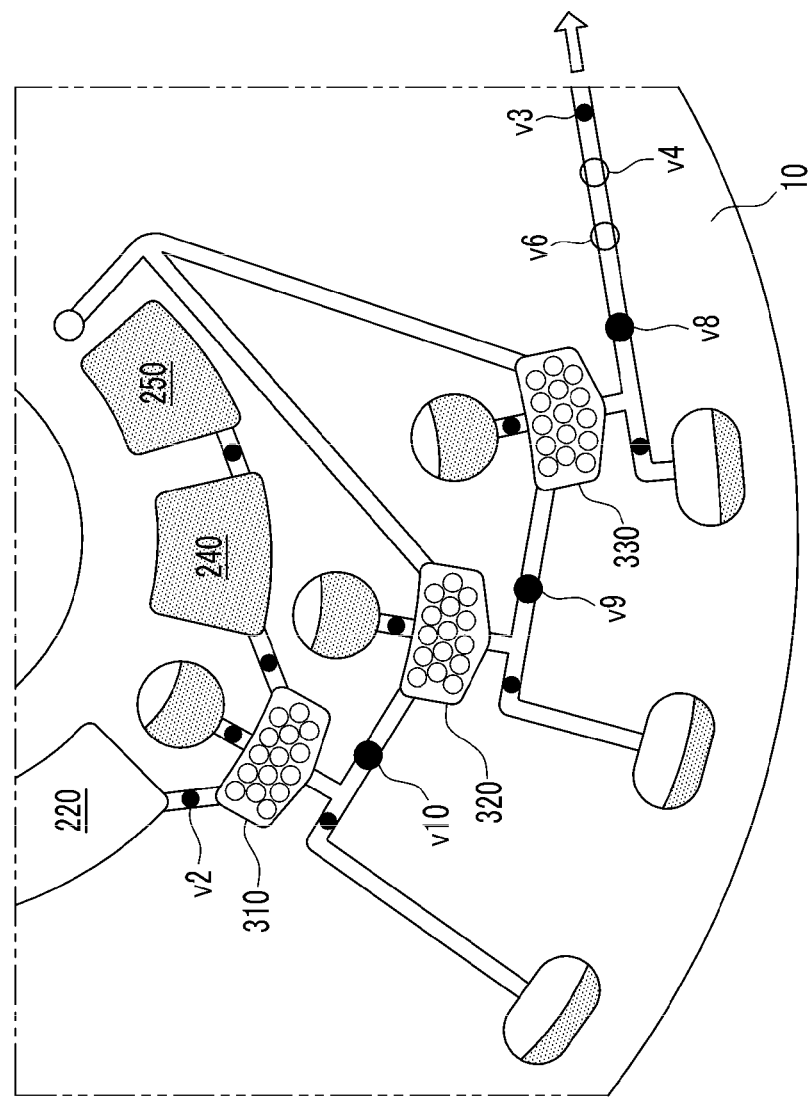

With reference to FIG. 6D, the normally closed valve v3 is opened by applying electromagnetic energy thereto, and the platform 10 is rotated to generate centrifugal force. Then, impurities, excluding the specimens which have reacted to the marker and the detection probes in the first, second, and third reaction chambers 310, 320, and 330, are transferred to and accommodated in the fifth storage chamber 260 (See FIG. 2)

After the impurities are discharged, electromagnetic wave energy is applied to the reversible normally open valve v4 to change it into a closed state.

Figure 6E:
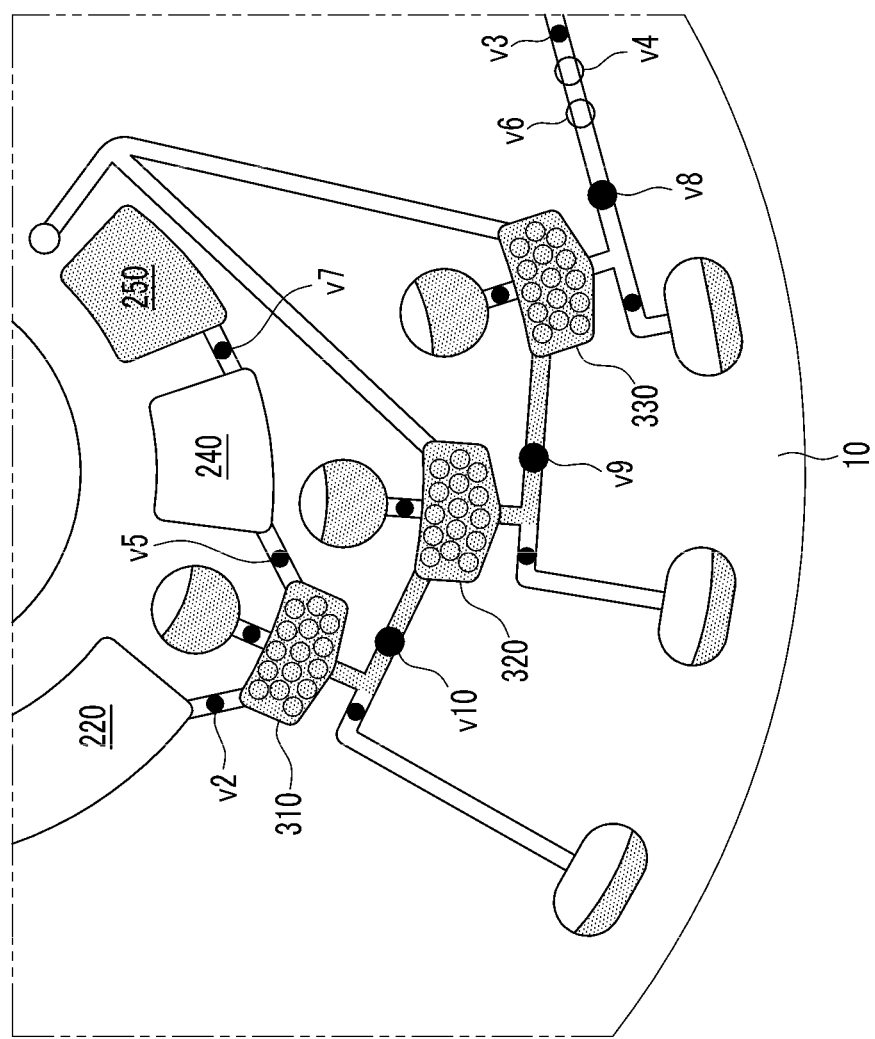

With reference to FIG. 6E, energy is applied to the normally closed valve v5 to open the normally closed valve v5, and the platform 10 is rotated to generate centrifugal force. The cleansing solution accommodated in the third storage chamber 240 is transferred by the centrifugal force to the first reaction chamber 310, the second reaction chamber 320, and the third reaction chamber 330 in this order to fill the first, second, and third reaction chambers 310, 320, and 330.

The reaction mediator of the first, second, and third reaction chambers 310, 320, and 330 is cleansed by using the cleansing solution, and then, the reversible normally open valve v4 is changed into an opened state. Thereafter, the platform 10 is rotated to discharge the cleansing solution and the reaction impurities within the first, second, and third reaction chambers 310, 320, and 330 to the fifth storage chamber 260 (See FIG. 2). Electromagnetic wave energy is applied to the reversible normally open valve v6 to change it into a closed state.

Figure 6F:
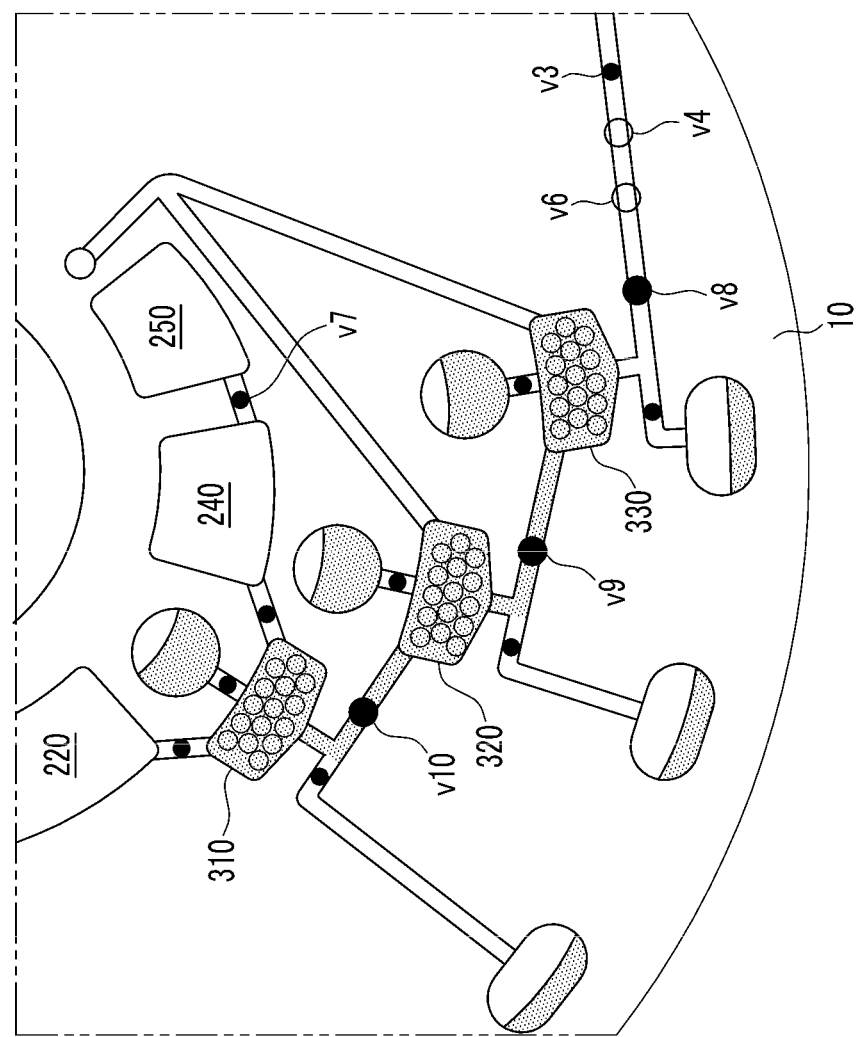

With reference to FIG. 6F, energy is applied to the normally closed valve v7 to open the normally closed valve v7, and the platform 10 is rotated to generate centrifugal force. The cleansing solution accommodated in the fourth storage chamber 250 is transferred by the centrifugal force to the third storage chamber 240, the first reaction chamber 310, the second reaction chamber 320, and the third reaction chamber 330 in this order to fill the first, second, and third reaction chambers 310, 320, and 330.

Figure 6G:
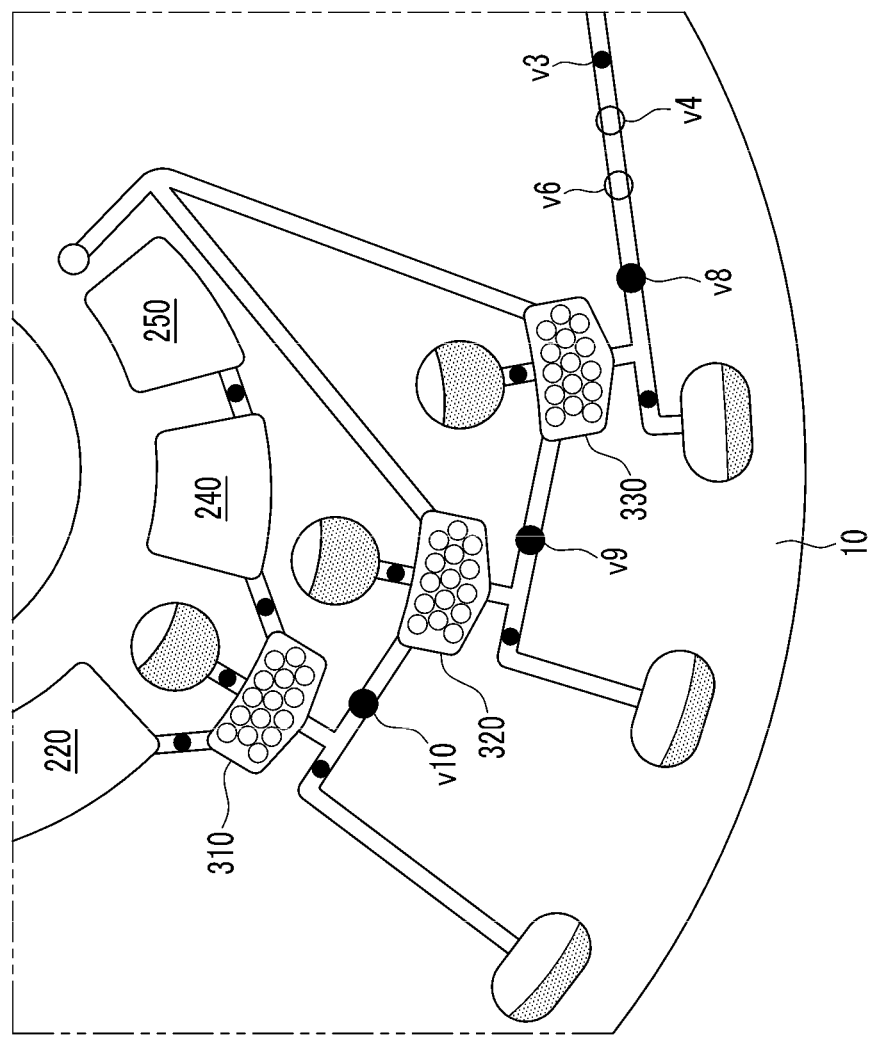

With reference to FIG. 6G, the reaction mediator of the first, second, and third reaction chambers 310, 320, and 330 is secondarily cleansed by using the cleansing solution, and then, the reversible normally open valve v6 is changed into an opened state. Thereafter, the platform 10 is rotated to discharge the cleansing solution and the reaction impurities within the first, second, and third reaction chambers 310, 320, and 330 to the fifth storage chamber 260 (See FIG. 2), and energy is applied to the normally open valve v8 to close the normally open valve v8. Since the cleaning process is performed twice, detection precision can be enhanced.

Figure 6H:
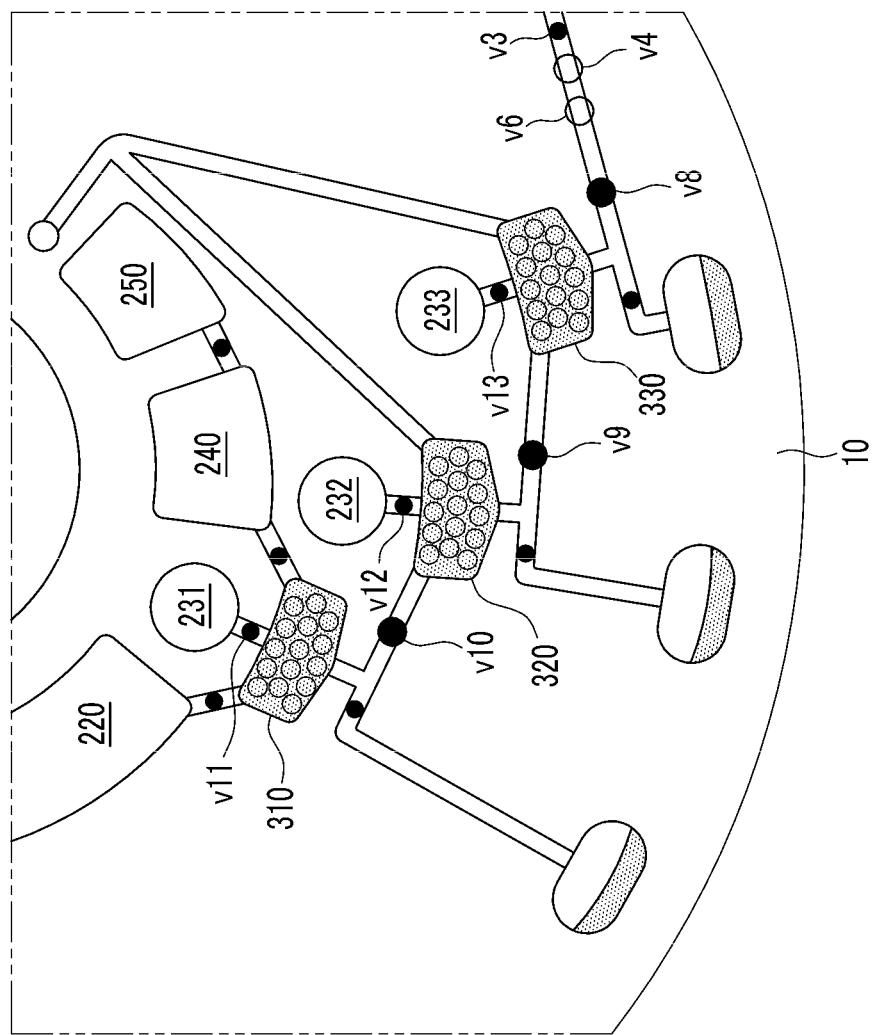

With reference to FIG. 6H, energy is applied to the normally open valve v10 and the normally open valve v9 to change them into a closed state, thus isolating the plurality of reaction chambers 310, 320, and 330.

Thereafter, energy is applied to the normally closed valve v11, the normally closed valve v12, and the normally closed valve v13 to open them. And then, the platform 10 is rotated to apply centrifugal force. The substrate solution accommodated in advance in the second storage chambers 231, 232, and 233 are transferred by the centrifugal force to the first, second, and third reaction chambers 310, 320, and 330, respectively.

The substrate solution transferred to the first, second, and third reaction chambers 310, 320, and 330 is mixed with the result of the reaction between the markers and the target materials within the respective first, second, and third reaction chambers 310, 320, and 330, and the mixture within the respective first, second, and third reaction chambers 310, 320, and 330 is expressed in a color corresponding to the amount of the specimens (target materials) according to the substrate reaction.

Figure 6I:
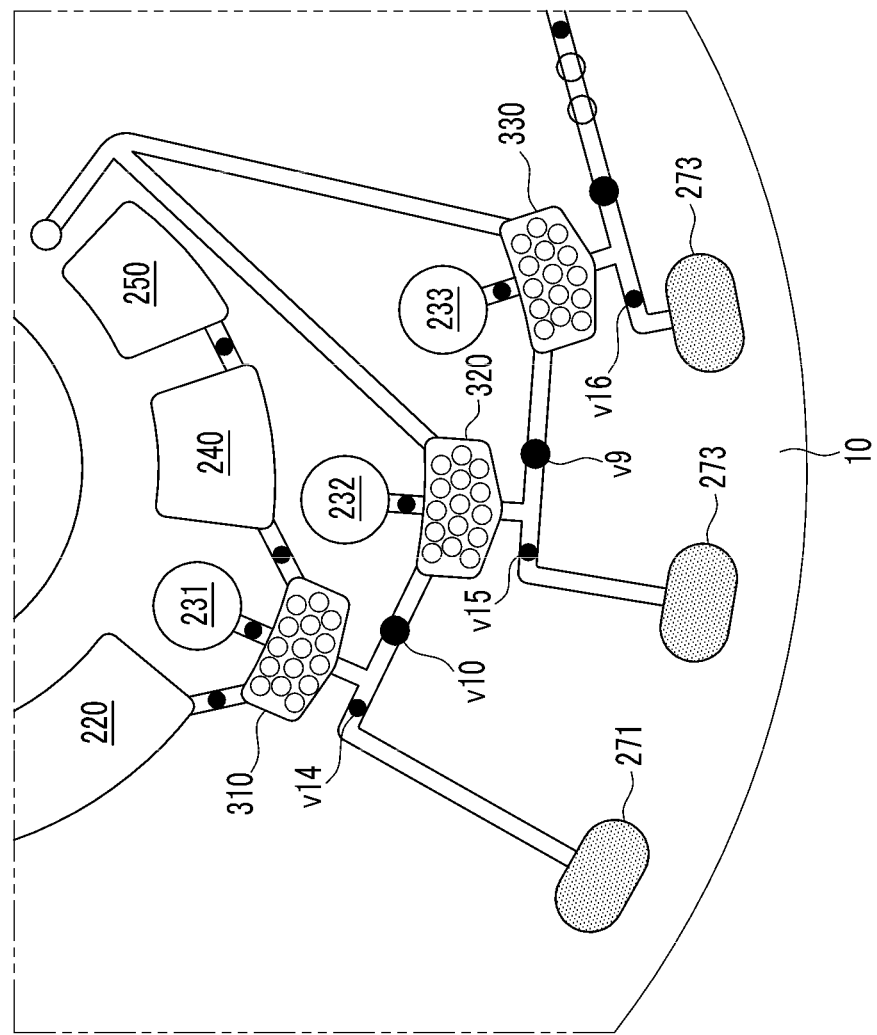

With reference to FIG. 6I, energy is applied to the normally closed valve v14, the normally closed valve v15, and the normally closed valve v16 to open them, and the platform 10 is rotated to apply centrifugal force. The mixture within the first, second, and third reaction chambers 310, 320, and 330 is transferred by the centrifugal force to the plurality of detection chambers 271, 272, and 273 in which the stop solution is accommodated in advance. The stop solution is mixed with the mixtures transferred from the first, second, and third reaction chambers 310, 320, and 330, terminating the substrate reaction.

Subsequently, absorbance of the detection chambers 271, 272, and 273 is measured by using a measurement device (not shown) including a light emitting diode (LED) and a photo diode. The measurement device includes a controller having a data storage and calculation function, and a display unit. The controller, which stores a reference absorbance in advance, compares the measured absorbance with the reference absorbance to calculate a specimen concentration with respect to each of the detection chambers 271, 272, and 273, and output information regarding the specimen concentration to the display unit.

Figure 7:
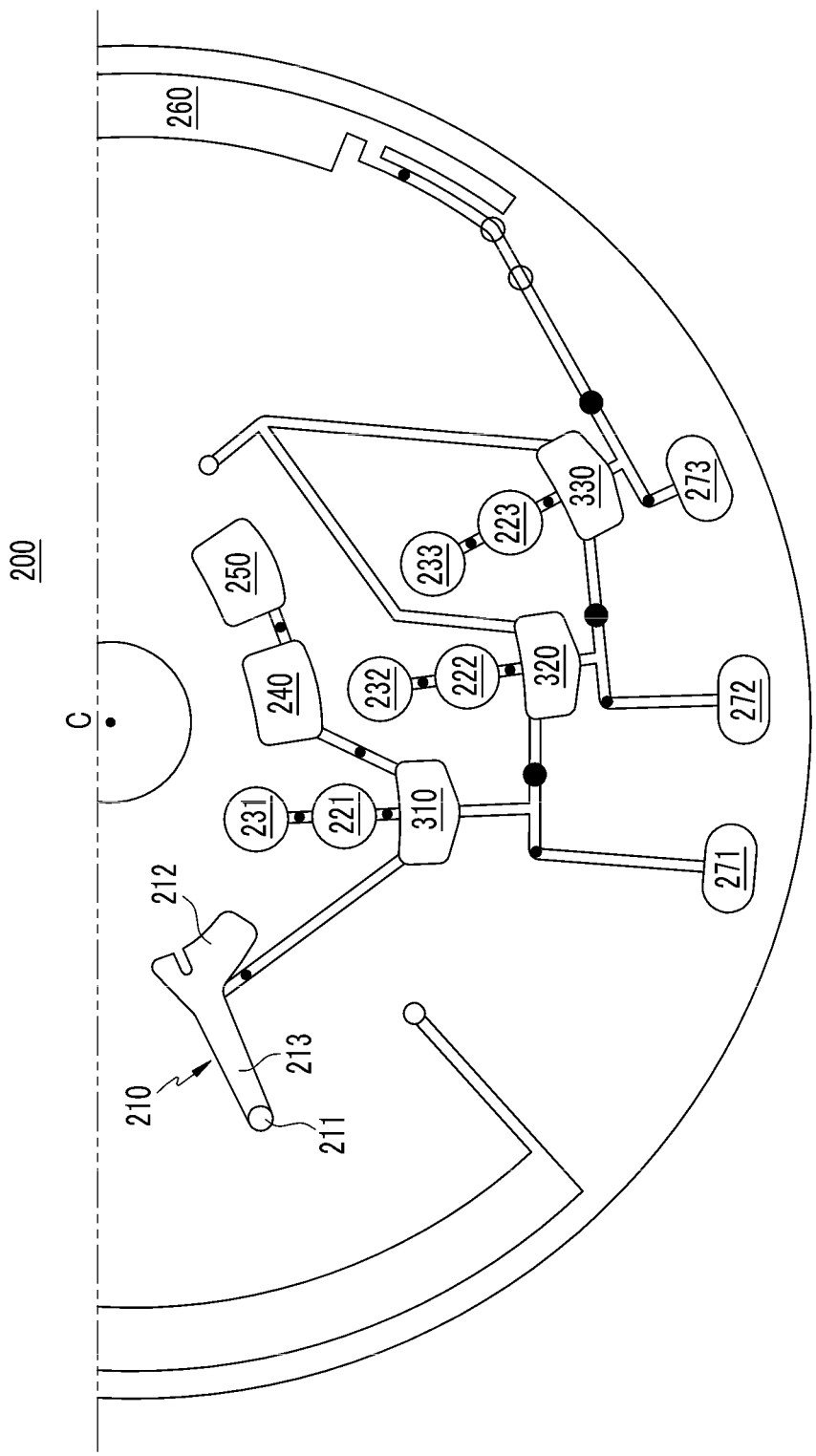
FIG. 7 is a schematic view of a microfluidic device according to a second embodiment of the present invention.

FIG. 7 is a schematic view of a microfluidic device according to a second embodiment of the present invention.

With reference to FIG. 7, a microfluidic device 200 according to a second embodiment of the present invention has the same configuration as that of the first embodiment as described above, except that a plurality of first storage chambers 221, 222, and 223 are installed at the plurality of reaction chambers 310, 320, and 330, separately by type.

The first storage chambers 221, 222, and 223 are installed between the second storage chambers 231, 232, and 233 and the respective reaction chambers 310, 320, and 330. Normally closed valves are installed between the second storage chambers 231, 232, and 233 and the first storage chambers 221, 222, and 223 and between the first storage chambers 221, 222, and 223 and the corresponding reaction chambers 310, 320, and 330.

In the microfluidic device 200 according to the second embodiment of the present invention, the sample without a sediment is sequentially transferred to the plurality of reaction chambers 310, 320, and 330, and the detection probes corresponding to the target materials accommodated in advance in the plurality of storage chambers 221, 222, and 223 are transferred to the plurality of reaction chambers 310, 320, and 330 to perform an incubation reaction.

Impurities, excluding the target materials coupled with the markers and the detection probes in the mixture within the reaction chambers 310, 320, and 330, are discharged, the reaction chambers 310, 320, and 330 are isolated, and then a substrate solution accommodated in advance in the plurality of second storage chambers 231, 232, and 233 is supplied to the reaction chambers 310, 320, and 330. Subsequently, the mixture within the reaction chambers 310, 320, and 330 are transferred to the detection chambers 271, 272, and 273, and absorbance of the detection chambers 271, 272, and 273 is measured, thus performing multiplexed analysis.

FIG. 8 is a schematic view of a microfluidic device according to a third embodiment of the present invention.

With reference to FIG. 8, a microfluidic device 300 according to a third embodiment of the present invention has the same configuration as that of the first embodiment, except that the second storage chambers and the detection chambers of the first embodiment are omitted and the plurality of first storage chambers 221, 222, and 223 accommodating at least one of labeling materials-bonded detection probe are installed at the plurality of reaction chambers 310, 320, and 330, respectively. The labeling materials may comprise at least one of a fluorescence material and a chemiluminescence material.

In the third embodiment of the present invention, a fluorescence material or a chemiluminescence material, instead of the HRP (horseradish peroxidase) of the first embodiment, is bonded to the detection probes accommodated in the first storage chambers 221, 222, and 223. In this case, the target materials can be directly detected from the reaction chambers 310, 320, and 330 without having the second storage chambers storing a substrate solution and the detection chambers storing a stop solution.

In the first embodiment, a mixture of the two or more types of detection probes are accommodated in the one first storage chamber 220, but in the third embodiment, the two or more types of detection probes are accommodated in the plurality of first storage chambers 221, 222, and 223, separately by type, and the respective detection probes are transferred to the corresponding reaction chambers 310, 320, and 330 so as to be used in a reaction. Normally closed valves are installed between the first storage chambers 221, 222, and 223, and the corresponding chambers 310, 320, and 330.

In the microfluidic device 300 according to the third embodiment of the present invention, a sample without a sediment is sequentially transferred to the plurality of reaction chambers 310, 320, and 330, and the fluorescence material or chemiluminescence material-bonded detection probes corresponding to the target materials stored in advance in the plurality of storage chambers 221, 222, and 223 are transferred to the plurality of reaction chambers 310, 320, and 330 to perform an incubation reaction.

Impurities, excluding the target materials coupled with the markers and the detection probes in the mixture within the reaction chambers 310, 320, and 330, are discharged, and then, a fluorescence or illumination detection signal of the reaction chambers 310, 320, and 330 is measured, thus performing multiplexed analysis.

The results of an immunological test, among the multiplexed analyzing methods using the foregoing microfluidic device, will now be described.

<Standard Curves of Target Proteins by Concentration>

An immunological test was performed on concentration of three types of target proteins of CRP, cTn I, and NT-proBNP by using the foregoing microfluidic device. 0, 1, 5, 10, 25, 50, 100 ng/mL were used as the concentrations of the respective target proteins, and fixed quantities of the target proteins were put in a saliva sample, which does not contain the target protein, by the foregoing concentrations and then used.

Figure 9A:
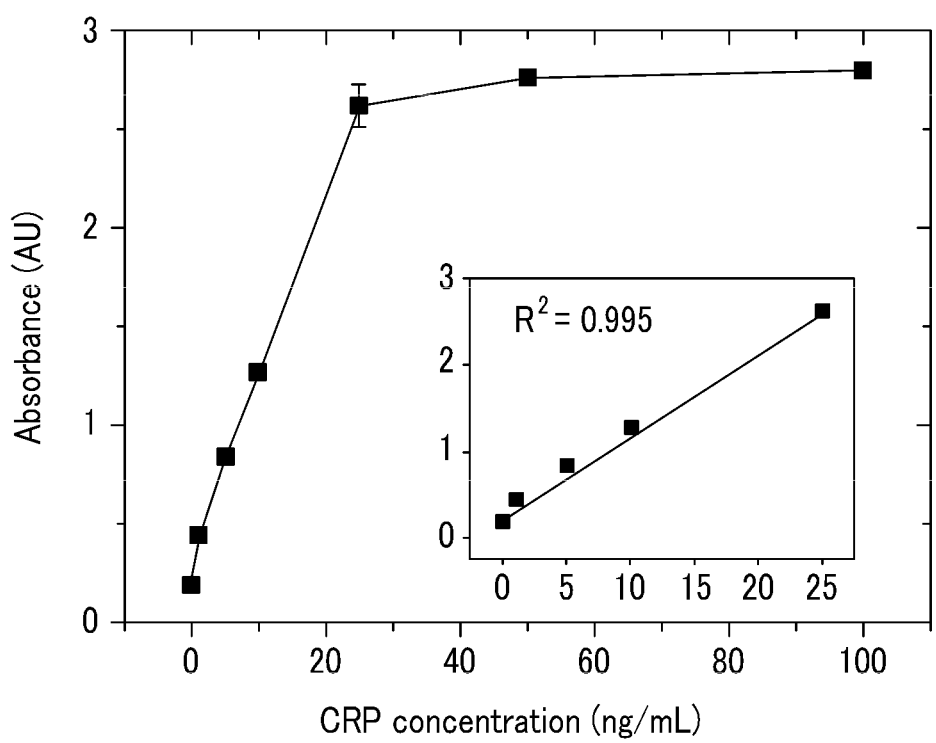
FIGS. 9A to 9C are graphs showing a standard curve obtained by measuring three target proteins over concentration.
Figure 9B:
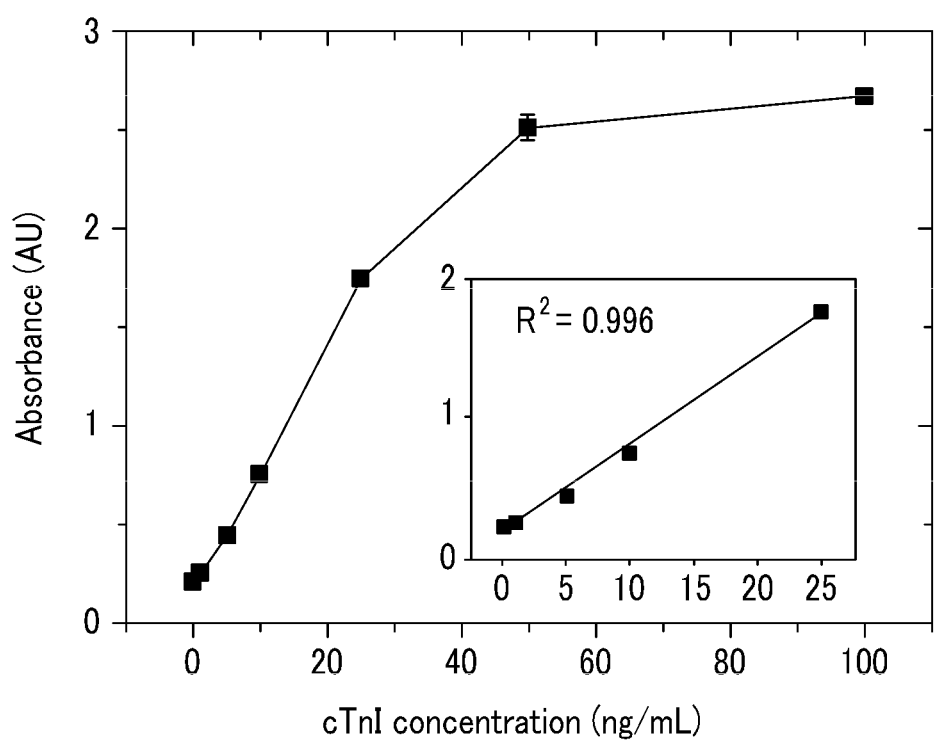
Figure 9C:
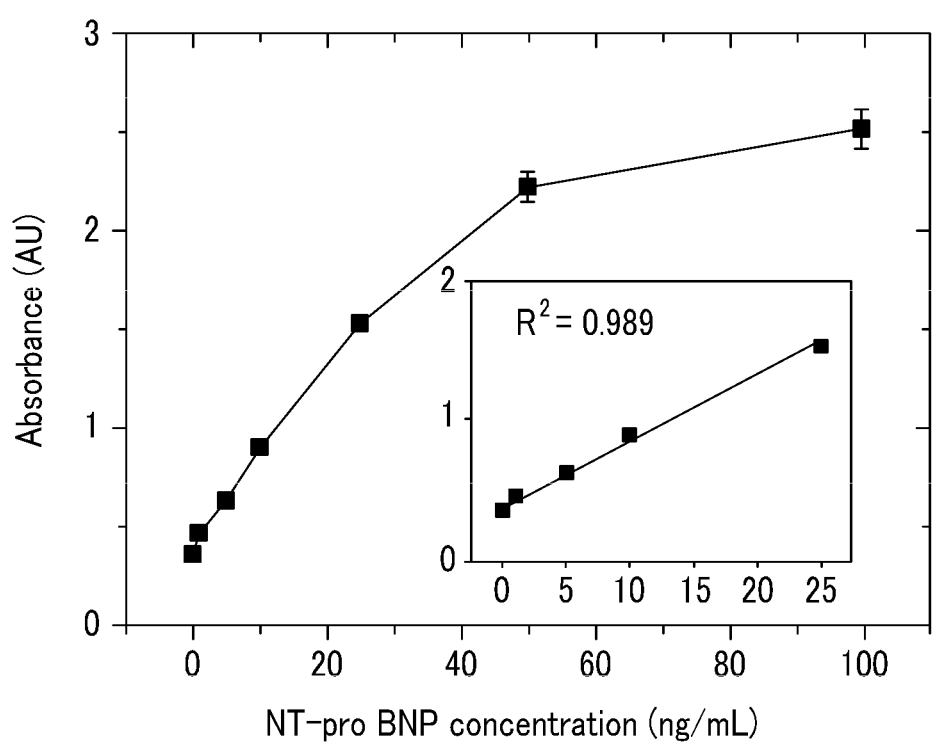

FIGS. 9A to 9C are graphs showing a standard curve obtained by measuring three target proteins over concentration, respectively. In FIGS. 9A to 9C, the insets within the graphs show dynamic ranges. According to the results of evaluating the standard curves, the dynamic ranges were 0 to 25 ng/mL in all of the CRP, cTn I, and NT-proBNP, and a limit of detection (LOD) was measured to be CRP 0.05 ng/mL, cTn I 0.19 ng/mL, and NT-proBNP 0.26 ng/mL. In FIGS. 9A to 9C, the unit AU of absorbance indicates an arbitrary unit.

<Test of Single Target Protein>

In order to evaluate test performance of the microfluidic device, an experiment was conducted such that one type of target protein was analyzed in three reaction chambers. Namely, a bead on which a capture antibody with respect to one type of target protein was fixed was disposed in the same manner in three reaction chambers, and testing was performed by using only one type of target protein and detection probe.

Table 1 below shows absorbance and precision (CV %) measured in the first to third reaction chambers over the concentrations of the target protein.

TABLE 1

| CRP concentration (ng/mL) | Absorbance | | | CV % |
|---|---|---|---|---|
| | First reaction chamber | Second reaction chamber | Third reaction chamber | |
| 0 | 0.197 | 0.193 | 0.186 | 1.47 |
| 1 | 0.429 | 0.463 | 0.428 | 5.46 |
| 5 | 0.833 | 0.857 | 0.823 | 2.03 |
| 10 | 1.285 | 1.25 | 1.272 | 1.95 |
| 25 | 2.51 | 2.662 | 2.69 | 4.10 |
| 50 | 2.787 | 2.732 | 2.763 | 1.41 |
| 100 | 2.792 | 2.827 | 2.787 | 0.88 |

With reference to Table 1, the absorbance values measured in the three reaction chambers are similar, and the precision values are all less than 10%. It can be confirmed from this results that the structure in which a fluid flows sequentially through the three reaction chambers of the microfluidic device according to the present embodiment scarcely affects the test performance.

<Test of Multiple Target Proteins>

An immunological test was performed by using the three types of target proteins of CRP, cTn I, and NT-proBNP. A bead coated with a CRP capture antibody, a bead coated with a cTn I capture antibody, and a bead coated with a NT-proBNP capture antibody were positioned in the first to third reaction chambers, respectively. CRP, cTn I, and NT-proBNP of each concentration were mixed in the sample so as to be used, and three types of detection probes were mixed to be used.

Figure 10A:
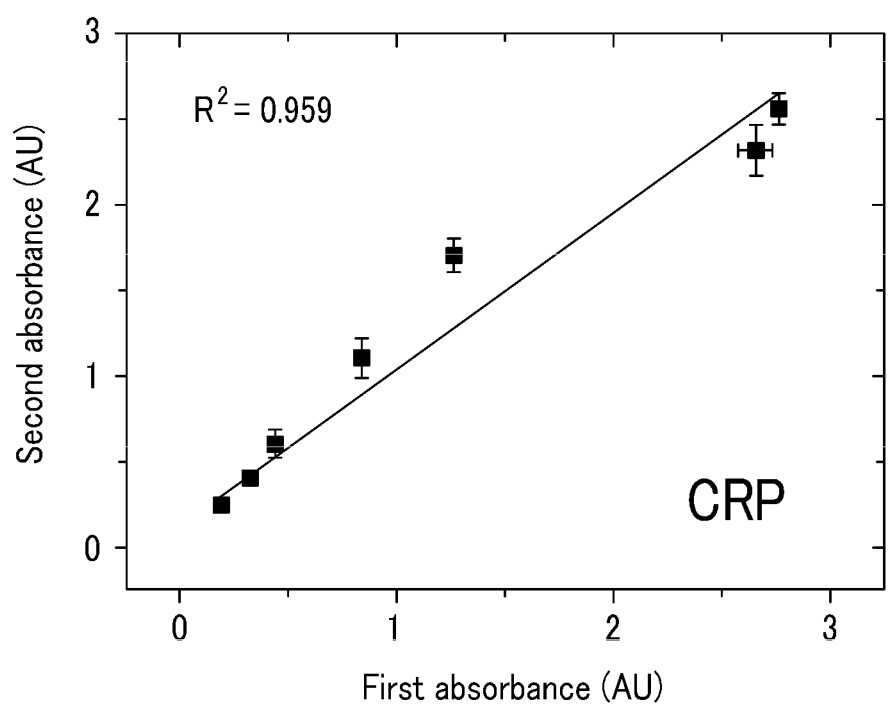
FIGS. 10A to 10C are graphs showing a correlation curve of each concentration obtained by comparing absorbance measured when a single target protein was used and that measured when three target proteins were used.
Figure 10B:
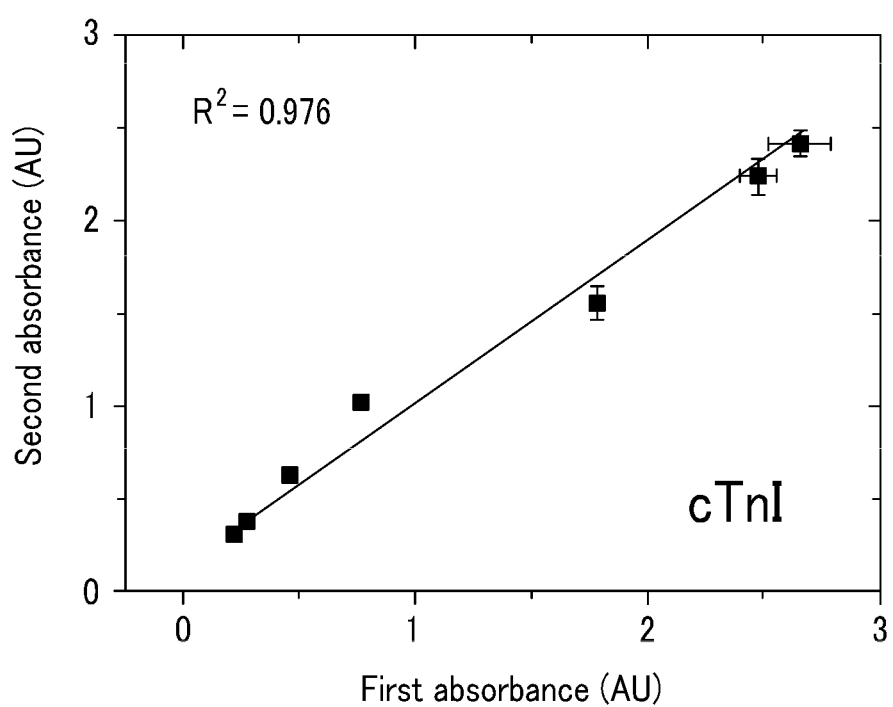
Figure 10C:
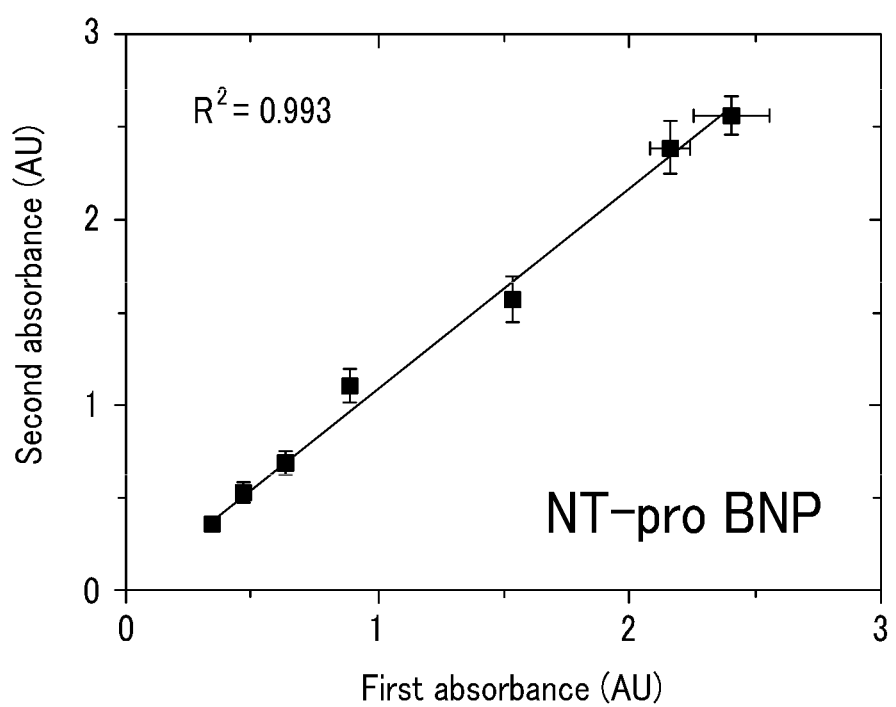

FIGS. 10A to 10C are graphs showing a correlation curve of each concentration obtained by comparing absorbance (first absorbance) measured when a single target protein was used and absorbance (second absorbance) measured when three target proteins were used.

As for the correlation curves with respect to the three types of target proteins in FIGS. 10A to 10C, values of coefficients of determination (R-squared) are all more than 0.95. Accordingly, it is noted that the measurement values in case of using the single target protein and in case of using the three types of target proteins are very similar. As a result, it is noted that there is no interference between or among the capture antibody, the target protein, and the detection probe with respect to the three types of target proteins, and thus, it does not affect the analysis results.

<Results of Performing Immunological Test Using Fluorescence Signal Detection Method>

The amount of target protein existing in saliva is $\frac{1}{100}$ times to $\frac{1}{1,000}$ times, or lower than, the amount of target protein existing in blood. Thus, in order to detect the target protein having very low concentration existing in saliva, a detection method having very high sensitivity is required. An experiment was conducted by using QuantaRed Enhanced Chemifluorescent HRP Substrate solution.

Figure 11A:
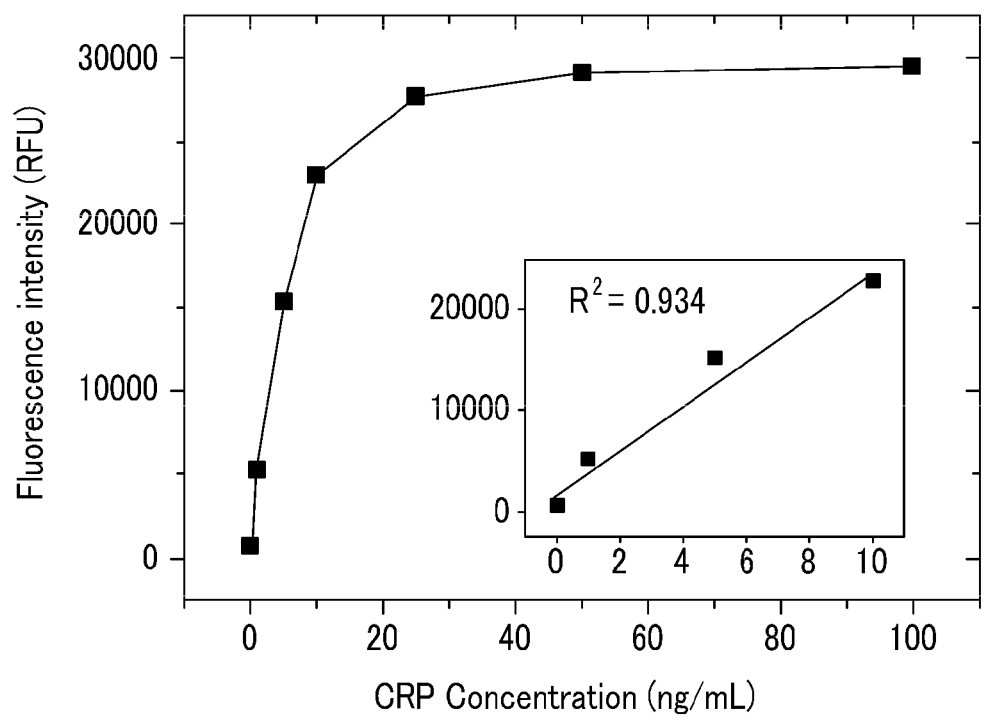
FIGS. 11A to 11C are graphs showing a standard curve obtained by measuring three target proteins over concentration.
Figure 11B:
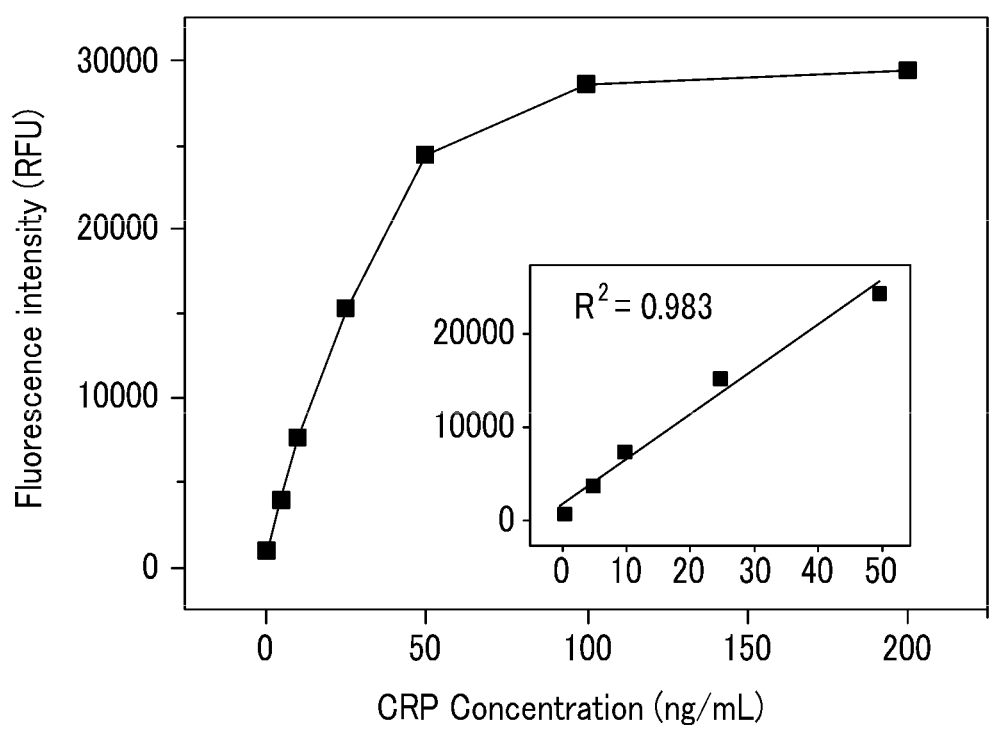
Figure 11C:
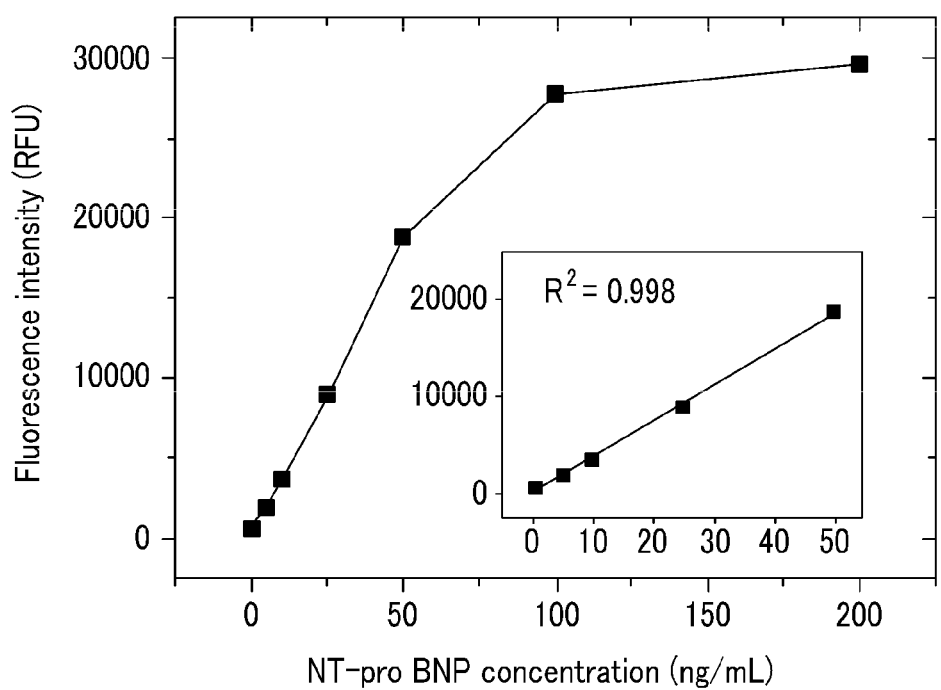

FIGS. 11A to 11C are graphs showing a standard curve obtained by measuring three target proteins over concentration, respectively. In FIGS. 11A to 11C, the evaluation of the standard curves reveals that the dynamic range was 1 to 10 ng/Ml in case of CRP, 1 to 50 ng/mL in case of cTn I, and 1 to 50 ng/mL in case of NT-proBNP. The limit of detection (LOD) was 7 pg/mL in case of CRP, 0.02 ng/mL in case of cTn I, and 0.02 ng/mL in case of NT-proBNP. It was confirmed that the use of the fluorescence signal detection method has superior sensitivity ten times the use of the foregoing absorbance detection method.

<Serum-Based Immunological Test>

The microfluidic device according to the present embodiment may also be applicable to a testing method using blood as well as saliva. In order to check whether or not blood affects the activity of an antibody for an immunological test, test performance was evaluated by using a target-free serum (Fetal Bovine Serum-Charcoal Stripped, GeneTex, USA). A fixed quantity of a target protein was put differently over concentration in the target-free serum and used.

Figure 12A:
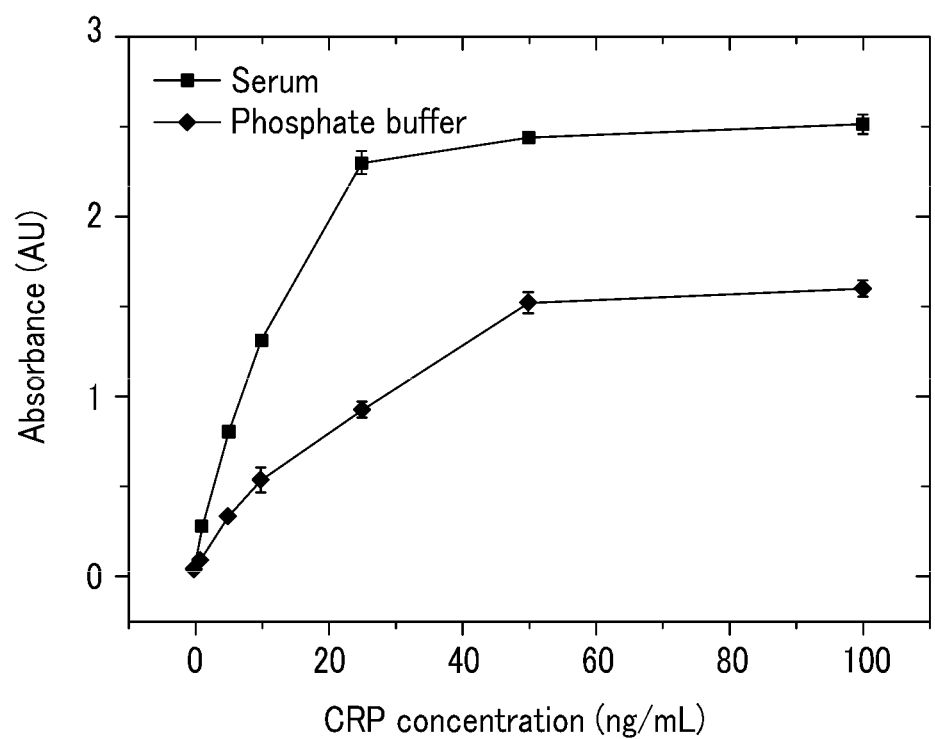
FIGS. 12A to 12C are graphs showing the comparison between absorbance measured when a serum was used and that measured when a phosphate buffer was used.
Figure 12B:
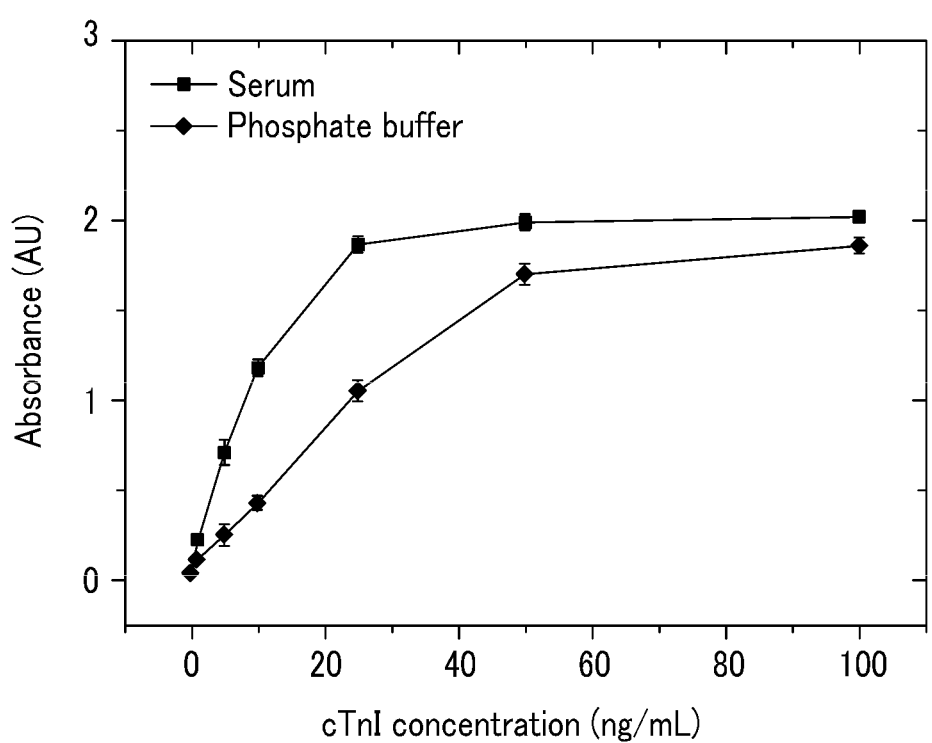
Figure 12C:
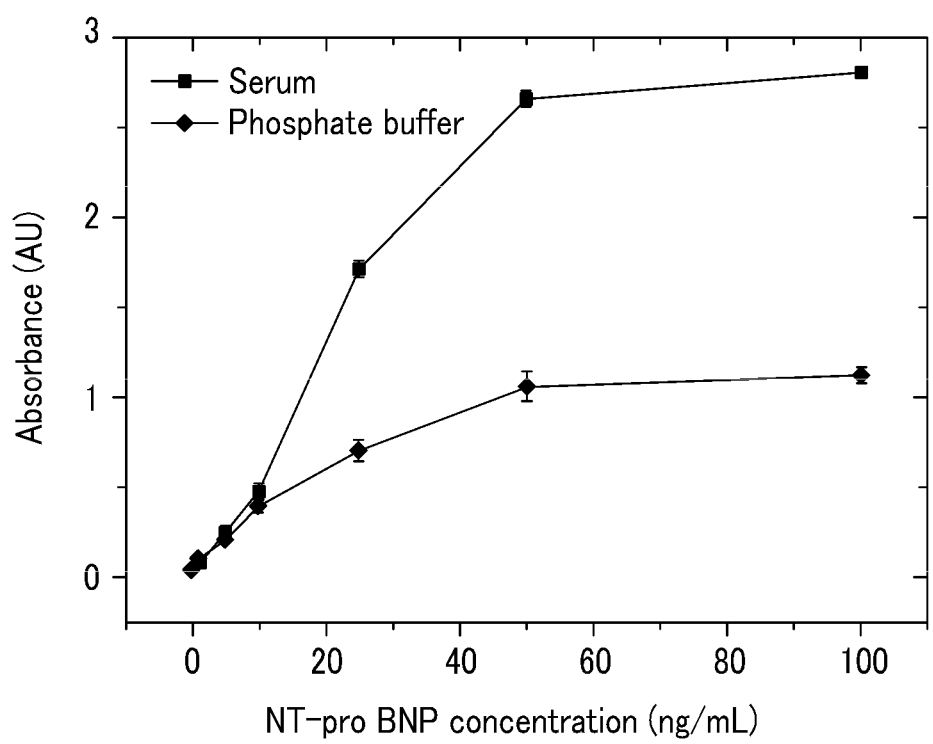

FIGS. 12A to 12C are graphs showing the comparison between absorbance measured when a serum was used and that measured when a phosphate buffer was used.

With reference to FIGS. 12A to 12C, in case of CRP, within the overall concentration range, the use of a serum exhibits higher absorbance than that of the use of phosphate buffer In case of cTn I, within a low concentration range, the use of a serum exhibits higher absorbance than that of the user of phosphate buffer. In case of NT-proBNP, within the low concentration range, the use of a serum has nearly similar absorbance to that of the use of phosphate buffer, while within a high concentration range, the use of a serum exhibits higher absorbance.

Thus, although there is a difference in aspects according to the target proteins, it is noted that the use of a serum has a higher detection signal than that of the use of phosphate buffer overall.

<Serum-Based Immunological Test Using Microfluidic Device>

An immunological test was performed by using a serum in a microfluidic device according to the present embodiment. Concentrations of the three types of target proteins were set to be 0, 1, 5, 10, 25, 50, and 100 ng/mL.

Figure 13A:
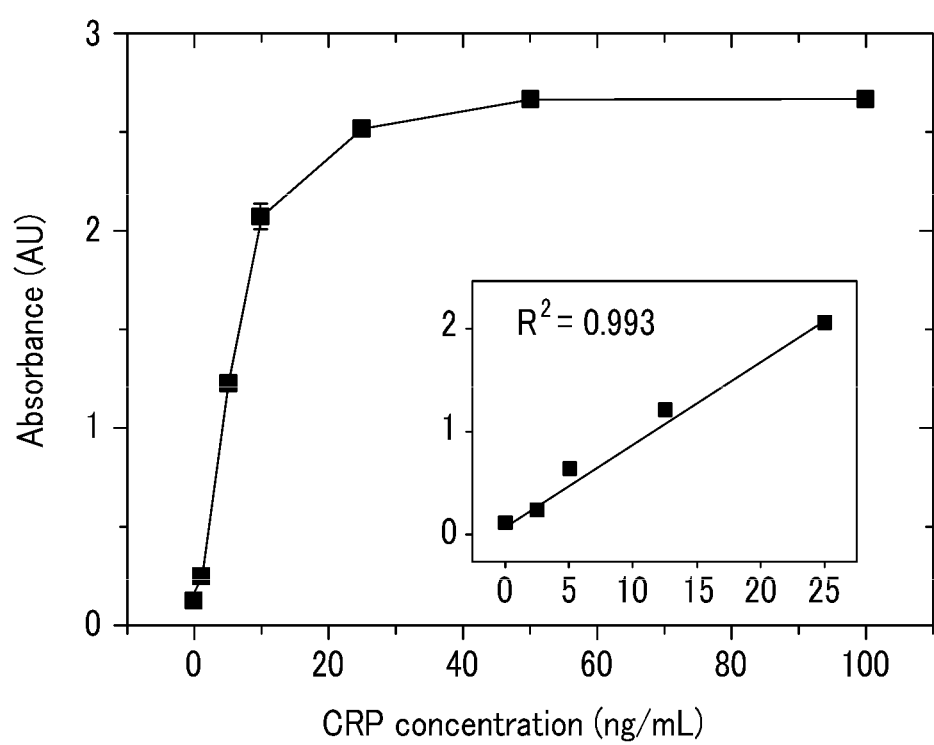
FIGS. 13A to 13C are graphs showing a standard curve obtained by measuring three target proteins over concentration.
Figure 13B:
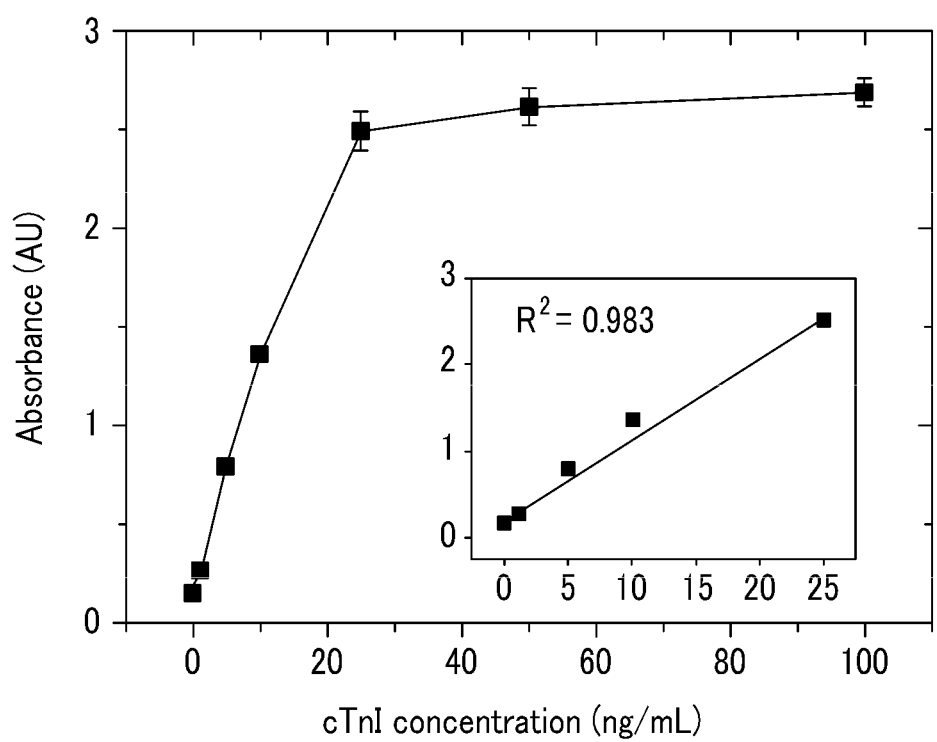
Figure 13C:
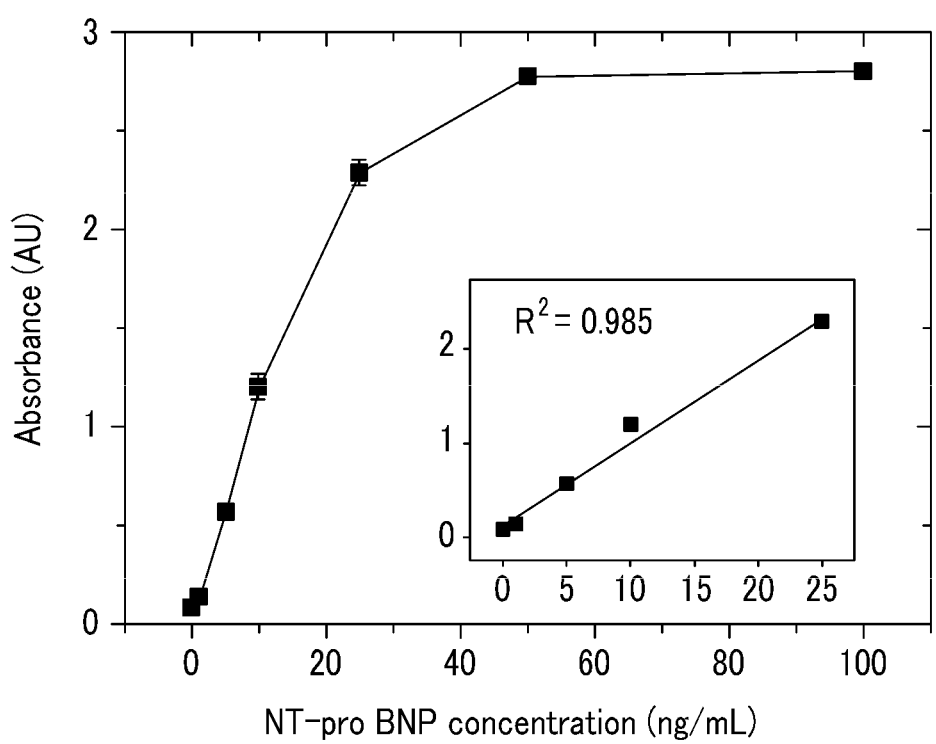

FIGS. 13A to 13C are graphs showing a standard curve obtained by measuring three target proteins over concentration, respectively. In FIGS. 13A to 13C, it is noted that the use of a serum has a much higher detection signal at the same concentration than that of the use of phosphate buffer or saliva. The results evaluation of the standard curve reveal that the dynamic range was 0 to 10 ng/mL in case of CRP, 0 to 25 ng/mL in case of cTn I, and 0 to 25 ng/mL in case of NT-proBNP, and the LOD was measured to be 0.02 ng/mL in case of CRP, 0.8 ng/mL in case of cTn I, and 0.8 ng/mL in case of NT-proBNP.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A microfluidic device comprising:
a rotatable platform and a microfluidic structure including a plurality of chambers formed within the platform and valves positioned between the chambers,
wherein the microfluidic structure comprises:
a first storage chamber accommodating a mixture of two or more types of detection probes,
a plurality of reaction chambers, each of the plurality of reaction chambers accommodating two or more types of markers specifically reacting to different types of target materials in a sample, separately by type, and
a plurality of detection chambers, each of the plurality of detection chambers being connected to a respectively corresponding one of the plurality of reaction chambers via a respectively corresponding normally closed valve and accommodating a stop solution,
wherein the first storage chamber and the plurality of reaction chambers are positioned such that the first storage chamber is positioned closest to a rotation center of the platform and a last one of the plurality of reaction chambers is positioned farthest from the rotation center among the first storage chamber and the plurality of reaction chambers, and each of the plurality of reaction chambers is distanced differently from the rotation center,
wherein the detection chambers are positioned to be farther than the reaction chambers connected thereto from the rotation center of the platform, and positioned to be parallel to one another along the circumferential direction of the platform,
wherein the plurality of reaction chambers comprise a first reaction chamber positioned closest to the first storage chamber, the first reaction chamber being connected to the first storage chamber through a normally closed valve,
wherein the plurality of reaction chambers are connected to one another via normally open valves, and are provided with the sample and the mixture of two or more types of detection probes from the first storage chamber by centrifugal force, and
wherein the microfluidic structure further comprises a plurality of second storage chambers, each of the plurality of second storage chambers being connected to a respectively corresponding one of the plurality of reaction chambers via a respectively corresponding normally closed valve and accommodating a substrate solution.

2. The microfluidic device of claim 1, wherein the microfluidic structure further comprises a sample separation chamber positioned to be closer to the rotation center of the platform than the first storage chamber, the sample separation chamber being connected to the first storage chamber through a normally closed valve.

3. The microfluidic device of claim 1, wherein the plurality of reaction chambers are isolated from another as the normally open valves are closed after the coupling reaction between the target materials and the markers, and wherein each of the plurality of reaction chambers is provided with the substrate solution from the respectively corresponding one of the plurality of second storage chambers.

4. A microfluidic device comprising:
a rotatable platform and a microfluidic structure including a plurality of chambers formed within the platform and valves positioned between the chambers,
wherein the microfluidic structure comprises:
a first storage chamber accommodating a mixture of two or more types of detection probes,
a plurality of reaction chambers, each of the plurality of reaction chambers accommodating two or more types of markers specifically reacting to different types of target materials in a sample, separately by type, and a plurality of detection chambers, each of the plurality of detection chambers being connected to a respectively corresponding one of the plurality of reaction chambers via a respectively corresponding normally closed valve and accommodating a stop solution, wherein the first storage chamber and the plurality of reaction chambers are positioned such that the first storage chamber is positioned closest to a rotation center of the platform and a last one of the plurality of reaction chambers is positioned farthest from the rotation center among the first storage chamber and the plurality of reaction chambers, and each of the plurality of reaction chambers is distanced differently from the rotation center, wherein the detection chambers are positioned to be farther than the reaction chambers connected thereto from the rotation center of the platform, and positioned to be parallel to one another along the circumferential direction of the platform, wherein the plurality of reaction chambers comprise a first reaction chamber positioned closest to the first storage chamber, the first reaction chamber being connected to the first storage chamber through a normally closed valve, wherein the plurality of reaction chambers are connected to one another via normally open valves, and are provided with the sample and the mixture of two or more types of detection probes from the first storage chamber by centrifugal force, and wherein the microfluidic structure further comprises a third storage chamber connected to the first reaction chamber through a normally closed valve and accommodating a cleansing solution.

5. The microfluidic device of claim 1, wherein the microfluidic structure comprises a third, fourth and fifth storage chamber, wherein the fifth storage chamber is connected to the last reaction chamber and accommodating a residual solution.

6. The microfluidic device of claim 5, wherein one normally closed valve, two reversible normally open valves, and one normally open valve are installed between the last reaction chamber and the fifth storage chamber.

7. The microfluidic device of claim 1, wherein the markers comprise capture molecules, and the capture molecules comprise at least antibodies, peptides, nucleotides, or polymers.

* * * * *